(12) United States Patent
Kawashima et al.

(10) Patent No.: US 8,395,600 B2
(45) Date of Patent: Mar. 12, 2013

(54) USER INTERFACE DEVICE

(75) Inventors: Takeshi Kawashima, Nisshin (JP); Takashi Nagata, Nagoya (JP)

(73) Assignee: Denso Corporation, Kariya (JP)

( * ) Notice: Subject to any disclaimer, the term of this patent is extended or adjusted under 35 U.S.C. 154(b) by 596 days.

(21) Appl. No.: 12/657,868

(22) Filed: Jan. 29, 2010

(65) Prior Publication Data

US 2010/0194713 A1 Aug. 5, 2010

(30) Foreign Application Priority Data

Jan. 30, 2009 (JP) .................................. 2009-20636

(51) Int. Cl.
*G06F 3/042* (2006.01)

(52) U.S. Cl. ...................................................... 345/175

(58) Field of Classification Search .......... 345/156–157, 345/173–175; 382/103–104, 190, 284; 701/400, 701/408

See application file for complete search history.

(56) References Cited

U.S. PATENT DOCUMENTS

| | | | |
|---|---|---|---|
| 6,407,733 B1 | 6/2002 | Kawakami | |
| 2003/0214488 A1* | 11/2003 | Katoh | 345/173 |
| 2007/0097096 A1* | 5/2007 | Rosenberg | 345/173 |
| 2007/0230929 A1* | 10/2007 | Niwa et al. | 396/15 |
| 2007/0262965 A1 | 11/2007 | Hirae et al. | |
| 2007/0285404 A1* | 12/2007 | Rimon et al. | 345/173 |
| 2008/0163131 A1* | 7/2008 | Hirai et al. | 715/863 |
| 2008/0211832 A1* | 9/2008 | Kumon | 345/641 |
| 2008/0231608 A1 | 9/2008 | Nagata | |
| 2008/0273755 A1* | 11/2008 | Hildreth | 382/103 |

FOREIGN PATENT DOCUMENTS

| | | |
|---|---|---|
| JP | 5-46308 | 2/1993 |
| JP | 09-035066 | 2/1997 |
| JP | 2000-6687 | 1/2000 |
| JP | 2000-259338 | 9/2000 |
| JP | 2000-335330 | 12/2000 |
| JP | 2004-26046 | 1/2004 |
| JP | 2006-072854 | 3/2006 |
| JP | 2007-069676 | 3/2007 |
| JP | 2007-152984 | 6/2007 |
| JP | 2008-152622 | 7/2008 |
| JP | 2008-158675 | 7/2008 |
| JP | 2008-234594 | 10/2008 |

OTHER PUBLICATIONS

Office Action dated Dec. 14, 2010, in corresponding Japanese Application No. 2009-020636.

* cited by examiner

*Primary Examiner* — Amare Mengistu
*Assistant Examiner* — Hong Zhou
(74) *Attorney, Agent, or Firm* — Harness, Dickey & Pierce, PLC

(57) ABSTRACT

A user interface device detects a fingertip placed on an imaging range. The imaging range is located or arranged so that a user inserts and place a hand along a predetermined direction. A device detects a tip area corresponding to the fingertip from the imaging range. The device determines whether the detected tip area is a finger or not. The determination can be performed by evaluating a size of the tip area, for example, whether the width is in an appropriate range or not. If the tip area is verified as a finger, a position of the fingertip is calculated. According to the device, it is possible to determine whether it is a finger or not by using a relatively simple algorithm. As a result, it is possible to eliminate objects other than finger and to provide sufficient accuracy for detecting the fingertip.

31 Claims, 25 Drawing Sheets

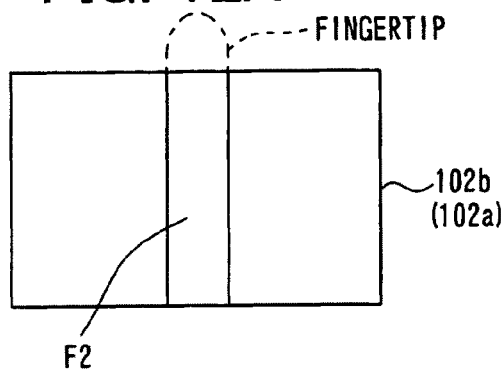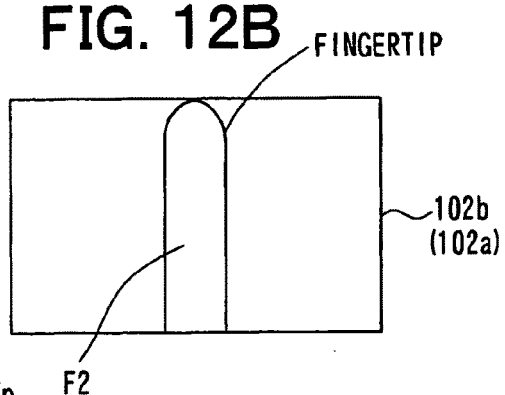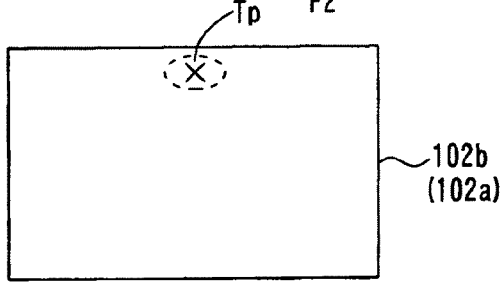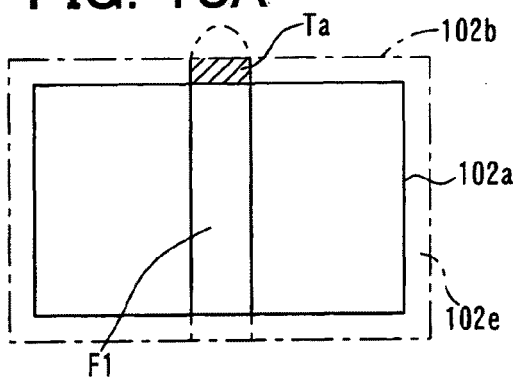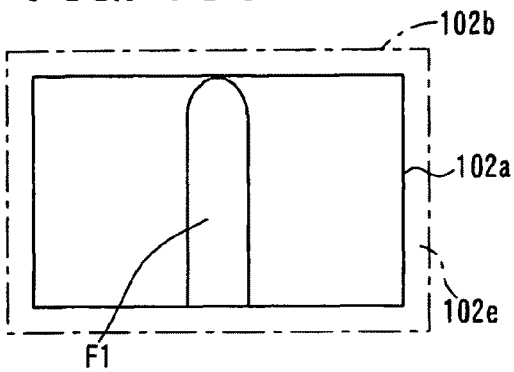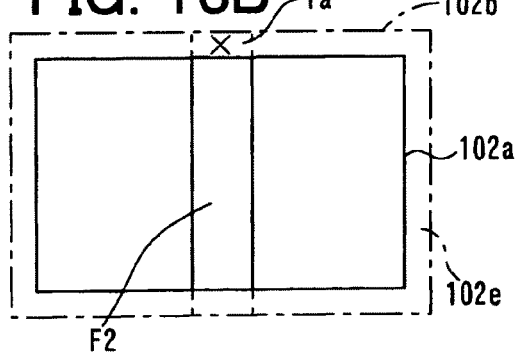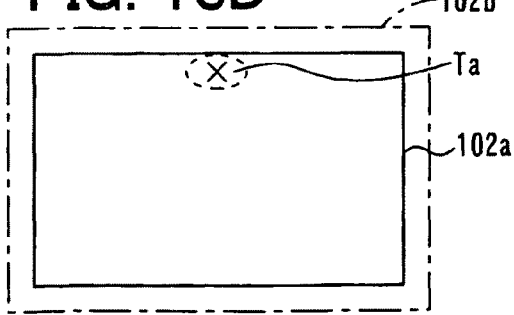

FIG. 26A
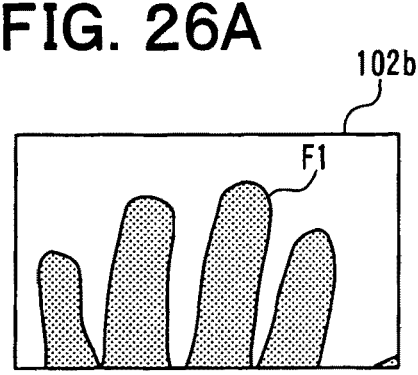
FIG. 26B
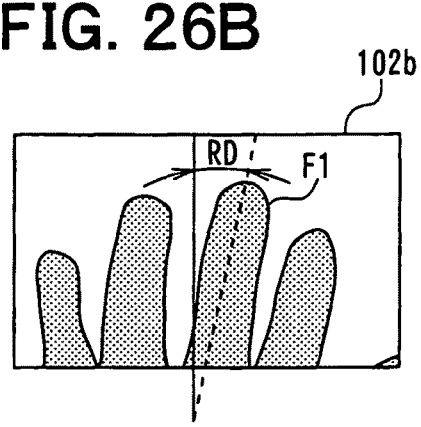
FIG. 26C
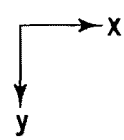
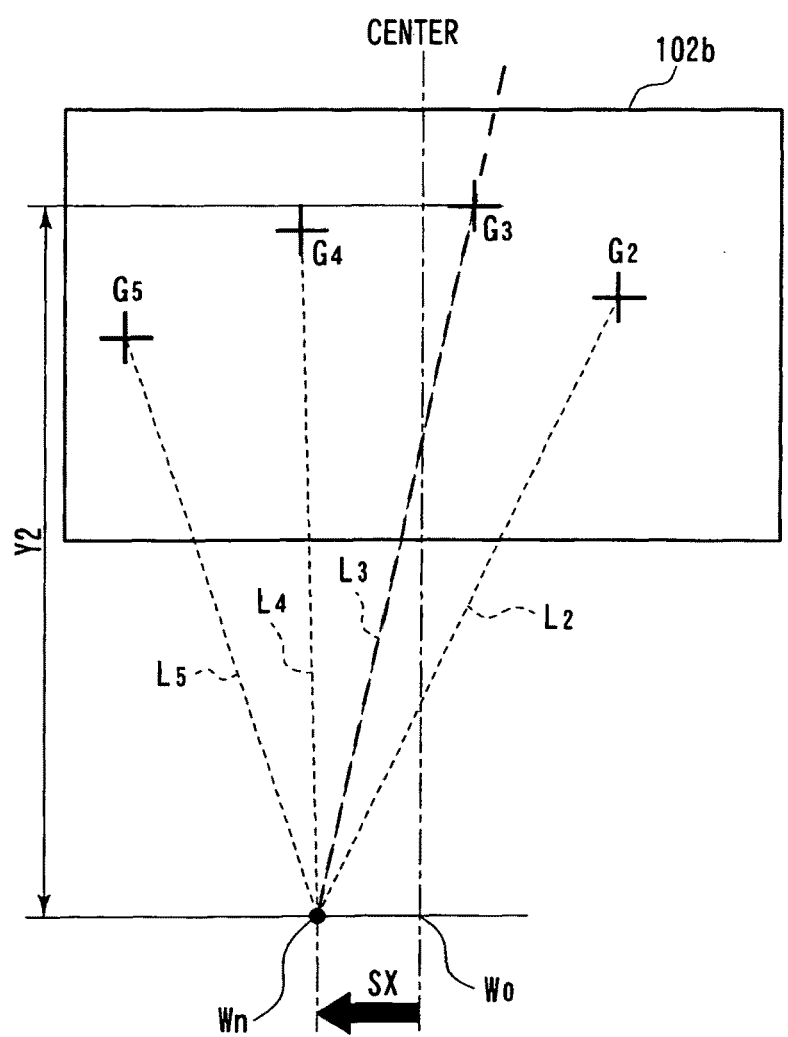

USER INTERFACE DEVICE

CROSS REFERENCE TO RELATED APPLICATION

This application is based on Japanese Patent Application No. 2009-20636 filed on Jan. 30, 2009, the contents of which are incorporated herein by reference in its entirety.

FIELD OF THE INVENTION

The present invention relates to a user interface device.

BACKGROUND OF THE INVENTION

Conventionally, a user interface device for a vehicle mounted device, such as a car navigation system, is proposed. In such a proposed device, a hand of an operator is taken as an image by a camera, then, the device extracts a finger image from the image data, and displays the extracted finger image area on an input display screen of GUI, Graphical User Interface system, for the vehicle mounted device. For example, the extracted finger image area is displayed on a screen of the car navigation system. For example, the following patent document 1 discloses a device which uses a camera attached on a ceiling of the vehicle. In this device, the camera takes an image of a hand which is placed to operate a switch panel disposed next to a seat. Then, the device displays the image of the hand and the switch panel on a liquid crystal panel disposed on a forward side of the operator. The following patent document 3 discloses a device in which a finger-shaped image is displayed in a superimpose manner. The finger-shaped image is different from the hand image taken by the camera. The finger-shaped image is narrower than the finger on the hand image. The finger-shaped image is placed on a corresponding finger position located from the hand image.

On the other hand, several methods and system for determining and locating a fingertip position on an image of a hand is proposed. For example, the patent document 2 discloses a method in which a finger is assumed to be stretched, and a fingertip position is located by an approximation using a circumscribed ellipse. The patent document 3 discloses a method in which an image of a finger is taken in a perspective manner from a distal end side to take an outer profile of the finger pad. In this method, the fingertip position is determined based on the pole of a high-order function which is obtained by approximating the outer profile of the finger pad. The patent document 3 discloses a method in which a circumscribed rectangle on the image taken is divided into two or more sub-rectangular areas. Then, it is determined that whether a shape on the image is considered as a shape which is not necessary for locating the coordinates of the fingertip based on a ratio of areas of the sub-rectangular areas or not.

PATENT DOCUMENTS

1: U.S. Pat. No. 6,407,733 (JP2000-335330A)
2: JP2008-152622A
3: JP2008-158675A
4: JPH09-35066A

According to the method disclosed in the patent documents 2 or 3, there may be a problem to detect something other than a hand as a fingertip erroneously. The documents do not disclose any method for removing things on the image other than a hand from candidates to be located fingertip positions. In the method disclosed in the patent document 4, since the imaging direction of a hand is not fixed, it is almost impossible to improve accuracy of locating a fingertip position. In detail, it is difficult to correctly determine an actual shape of a hand based on a ratio of areas for each sub-rectangular areas and a color of a hand area. Especially, it is difficult to correctly determine a fingertip area, because it is impossible to know a direction in which the fingertip area appears.

For example, if a device just displays an outline of a hand taken as an image on a display screen in an overlapping manner, there may be no serious problem. Even if something other than a hand is taken on an image, the operator can recognize the something, because the hand is displayed with the something. However, according to the method disclosed in the patent document 3, a finger shaped image is displayed instead of an actual finger image. Therefore, if an error detection of a fingertip is occurred, a finger shaped image is also displayed on the error position. For example, even if the operator apparently knows that a hand is not placed on an imaging range, the finger shaped image is displayed on a screen by mistake. Therefore, an operator may feel a strong uncomfortable feeling.

SUMMARY OF THE INVENTION

It is an object of the present invention to provide a user interface device which can ignore things other than a hand correctly.

It is another object of the present invention to provide a user interface device which can provide sufficient accuracy for locating a fingertip position.

It is still another object of the present invention to provide a user interface device which can provide sufficient accuracy for locating a fingertip position by a simple algorithm.

According to an example of the present invention, a user interface device is provided with the following features. The user interface device includes an imaging device which takes image of an imaging range in which a hand is placed along a predetermined insertion direction. The user interface device includes a tip area detecting module which detects a tip area in the insertion direction from an image taken by the imaging device. The tip area may be called as a tip region. The user interface device includes a tip area locating module which locates a position of the tip area in the imaging range and sets the position of the tip area as a tip position. The user interface device includes a verifying module which verifies that whether the tip position indicates a position of an actual fingertip based on at least one of a size of the tip area and an area of the tip area. The user interface device includes an outputting module which outputs coordinates of the tip position as coordinates of the actual fingertip if the tip position is verified as the position of the actual fingertip.

According to a configuration, an operator's hand is inserted in the imaging range of the imaging device in a predetermined direction. Therefore, a fingertip is located at a distal end side in the insertion direction. The tip area on the image in the insertion direction can be extracted. it is possible to determine whether the tip area is an actual fingertip or not based on a determination of whether the size and area of the tip area have an appropriate value.

The tip area detecting module may be configured as a module which uses a first image which is the image taken by the imaging device and a second image which is an image obtained by shifting the first image parallel to the insertion direction, and detects non-overlapping area generated on a distal end side in the insertion direction between the first image and the second image as the tip area. According to a configuration, the tip area can be easily detected as the non-overlapping area by overlapping the original image and the shifted image and calculates the difference between them.

In this configuration, the image of the hand inserted in the imaging range is taken by reflection light from a palm side surface of the hand. If the device is configured to extract and determine a fingertip area by a difference, i.e., a non-overlapping area, between the first image and the second image shifted in parallel, it is not necessary to employ an imaging configuration disclosed in the patent document 2. In the patent document 2, an image of a finger pad is taken by an imaging method from an obliquely upper side. In the configuration, it is sufficient to image an outline of a hand. Therefore, the device can be configured to take an image of a hand from a bottom side of a hand which is inserted into the imaging range in a forward direction along a horizontal direction while placing a palm side downwardly. As a result, it is possible to reduce influences caused by disturbance light or a foreign substance which enters between a hand and a camera disposed on a ceiling as shown in the patent document 2. The imaging device may be configured to include a lighting device which lights up a surface of a hand to be imaged, and the imaging device takes an image of a hand based on reflected light from a hand. It is possible to ease processing of an image separation between a hand image and a background.

The tip area locating module may locate a position of the tip area which is determined by the non-overlapping area and sets the position of the tip area as a potential tip area of a fingertip point. A position of a non-overlapping area may be defined on the coordinates system based on a representative point which satisfies a predetermined geometrical relation with the non-overlapping area. For example, a geometric center-of-gravity position of a non-overlapping area can be used for the representative point. However, a representative point is not limited to a geometric center-of-gravity position.

If it is an actual fingertip area, the size or the area of the non-overlapping area should show a value in a predetermined range corresponding to a finger of human being. Therefore, it is possible to remove or ignore a non-overlapping area which shows a size or an area outside the predetermined range as an area which is not an actual fingertip of an operator, such as something other than a hand or an area of a hand other than a fingertip. Therefore, a verifying module may be configured to determine that whether the non-overlapping area is an actual fingertip area or not based on whether a size or an area of the non-overlapping area is in a predetermined range or not.

The device may include a hand guide member which guides a user to insert a hand to the imaging range while restricting movement of the hand along a guiding direction which corresponds to the insertion direction. Thereby, the insertion direction of an operator's hand to the imaging range can be fixed. A longitudinal direction of the finger of the operator imaged by the camera almost always shows a spatial relationship parallel to the guiding direction. The size of the non-overlapping area will be mostly in agreement with a width size in the direction which intersects perpendicularly with the guiding direction. The verifying module may be configured to determine that whether the non-overlapping area is an actual fingertip area or not based on whether a width of the non-overlapping area is in a predetermined range or not, where the width is measured in a perpendicular direction to the guiding direction. Thereby, a direction for measuring the size of the non-overlapping area can be fixed. For example, the measuring direction can be limited in the direction which intersects perpendicularly with the guiding direction. However, the measuring direction may be deviated in an angular range of about ±30 degrees from the direction crossing at the right angle. As a result, the measurement algorithm for determining whether a tip area is an actual fingertip area can be simplified substantially.

Next, the patent document 4 discloses a method which aims to determine a condition in which one finger is used to point a position, for example, the index finger is used to point a position on a surface. By using a method in which an image of a circumscribed rectangle is divided into a plurality of sub-rectangular areas, and it is determined that it is a hand or not based on a ratio of the areas of the sub-rectangular areas, it is possible to determine that fingers are stretched, but, it is impossible to determine each of positions of a plurality of fingertips. However, in the embodiment, a fingertip area is detected by a non-overlapping area between the first image that is a taken image, and the second image that is an image shifted parallel to the insertion direction. The tip area detecting module may detect a plurality of non-overlapping areas as potential tip areas, when a plurality of non-overlapping areas are separately detected by inserting a plurality of fingers into the imaging range. As a result, it also becomes possible to utilize a plurality of fingertip areas for a position input simultaneously. It is possible to improve the degree of freedom of an input of the user interface device. Even if some fingers are closely located, it is possible to detect each of the tip areas separately because each of the fingertip areas are rounded.

The verifying module may be configured to determine that whether the non-overlapping area is an actual fingertip area or not based on whether a value S/d estimated as a finger width is in a predetermined range or not, where a value S is a total area of the image, and a value d is a sum of distance between each non-overlapping area and an edge of the imaging range, the edge being located on an entering side of the insertion direction. In this configuration, the device does not determine a width of an overlapping area directly. The device estimates a value S/d as a finger width. A value S is a total area of the image. A value d is a sum of distance between each non-overlapping area and an edge of the imaging range located on an entering side of the insertion direction. It is possible to determine that whether the image contains a finger image continuously connected from a distal end to the edge located in the insertion side of the hand of the imaging range. It is possible to prevent effectively a problem in which a something, e.g., a small foreign matter, such as coin, other than a hand is erroneously determined as a finger. Similarly, the verifying module may determine whether the non-overlapping area is an actual fingertip area or not based on whether a value S/N estimated as a mean finger area is in a predetermined range or not, where a value S is a total area of the image, and a value N is the number of the non-overlapping area.

The device may further include a display device having a display range which is related to the imaging range by a coordinates system and a fingertip point displaying module which displays the actual fingertip point on the display range in a visible manner. By displaying the fingertip point determined from the image on the screen of the display device, the device can provide useful information to enable an operator to recognize the position of a manual input directly, and can be used effectively as an input device of a graphical user interface (GUI).

In this case, the fingertip point displaying module may display a hand image taken by the camera as it is, or a hand image which is processed at least includes a contour of the hand. The hand image is displayed on the screen according to a correspondence relation between the imaging range and the display range. In this case, when the tip area of the image is not determined as an actual fingertip area, the device may be configured so that information from the image taken by the camera is not displayed.

The fingertip point displaying module may be configured to include a pointer displaying module which displays a pointer image for indicating the actual fingertip point based on a pointer image data prepared separately from the image, and which does not display the pointer image at the tip area which is not determined as the actual fingertip. According to the configuration, there is an advantage to be capable of freely forming display form of a pointer image independently from the contents of the taken image in order to make it easy to recognize a fingertip point. In addition, the device is configured so that a pointer image is not displayed on the tip position which was not determined as an actual fingertip. As a result, it is possible to prevent a problem in which an operator feels uncomfortable feelings caused by inconsistency between a displayed image and the actual position of the hand. That is because a finger-shaped image is attached on a position which is erroneously detected due to a something other than a finger and is displayed on the display range despite that the operator clearly recognizes that the hand is not placed on the imaging range.

The pointer displaying module may be configured to display the pointer image with a shape narrower than an actual finger in the image taken by the imaging device. It is possible to display the pointer image which indicates each finger and has a shape narrower than the actual finger image regardless of the actual finger image on the image taken by the imaging device. As a result, it is possible to prevent uncomfortable feeling caused by displaying a finger image too thick.

The pointer image may be a simulated finger image which simulates a contour shape of the finger or an actual finger image which is taken by imaging each finger in a separated manner. Thereby, it is possible to provide a real expression near an actual hand, even if the finger image is narrowed. It is possible to provide good feelings corresponding to an actual manipulation similar to looking at an actual hand despite using the pointer image by data different from the actual hand.

The device may include a restricting member which restricts an imaging distance of the imaging device to a hand as an object in a predetermined distance. In this case, the imaging range of the imaging device may be configured to have a size capable of imaging only a part of fingers on a distal end part of a hand of an average adult, when the imaging distance to the hand of the average adult is restricted and the fingers are stretched. The part of the fingers is formed by the index finger, the middle finger, the third finger, and the little finger. Thereby, only an end part extending from a root part of a finger is displayed on the display range. A shape of a hand other than a finger does not affect displaying processing, therefore, it is possible to simplify displaying process using the image taken by the camera.

In a case that the imaging range is reduced due to a strict restriction about a mounting space, such as a case for mounting the device on a vehicle, the imaging range may have a size which can take an image of whole of at least two fingers among the index finger, the middle finger, and can not take an image of whole of four fingers. If it expresses in the absolute size in consideration of the size of an average adult's palm, the imaging range is a rectangular shape having a longitudinal length corresponding to a width direction of the hand and a lateral length, the longitudinal length being in a range equal to or longer than 60 mm and equal to or shorter than 80 mm, the lateral length being in a range equal to or longer than 30 mm and equal to or shorter than 55 mm. If an imaging range is reduced, but the display range is maintained, when displaying the outline of the actual finger as it is, the actual finger image is largely enlarged by an amount of reduction of the imaging range. For example, in a case that the display device displays software-key images on the display range at corresponding positions. The software-key images correspond to key-operation areas defined on an input coordinates plane of an input device. In addition, the software-key images are displayed with sizes and gaps so that a plurality of software-key images arranged on a width direction of the finger are overlapped with an imaginary finger projection area of the actual finger image. The imaginary finger projection area is provided by imaginary projecting the actual finger image on the imaging range onto the display range at a corresponding position and with a corresponding size based on the coordinates system. In this case, it is so difficult to know whether a finger is oriented to a target one of the software-key images or not. As a result, there may be a problem to press a wrong software-key next to the target one by mistake. However, if the pointer image displayed on the screen is the pointer image with narrowed width rather than original actual finger image, it is possible to reduce the number of the software-key image which overlaps with the pointer image as compared with the case where the original actual finger image is displayed as it is. As a result, it is possible to reduce a feeling of high density of the software-key images around the pointer image. It is possible to know which one of the software-key images is pointed and operated. As a result, it is possible to prevent the problem to press a wrong software-key image next to the target one, and to improve operability.

The restricting member may be configured to be disposed in a fixed manner to satisfy a predetermined spatial relationship with respect to the imaging device. The restricting member includes a transparent support plate which is capable of supporting the hand to be imaged on one side surface thereof. The imaging device takes the image of the hand through the transparent support plate from the other side surface of the transparent support plate. In this case, it is possible to put a hand on the transparent plate, it is possible to keep a distance between a hand and a camera constant.

The transparent support plate may be a component of an input device on which an input surface corresponding to the display range is defined on a side surface. The display device may be configured to display an input position on the display range corresponding to the input coordinates system by the pointer image. Thereby, the operator can know a position of the finger on the input surface by the pointer image on the screen, and can carry out an exact input operation according to the contents of the screen of the display device. This configuration is advantageous for a configuration in which the display device is disposed on a place away from a direction which allows the operator to look a finger on the input surface directly. For example, there may be a case in which the display range, i.e., the screen, of the display device is arranged on a place away from a direction on which the operator can directly look a finger on the input surface. For example, in a case of a user interface device for an electronic equipment for mounting on a vehicle, such as a car-navigation system, the input surface and the display device are separately arranged. The input surface may be arranged on the right side or the left side of a seat where the operator sits down. The input surface may be arranged on an obliquely forward side to the side of the seat. The display device may be arranged on a place which is above the input surface and is a forward side or an obliquely forward side from the operator. By determining the actual fingertip with sufficient accuracy and displaying it as a hand operating position on the screen, it is possible to allow the operator to input easily and in a directly recognizable manner despite the operator can not look both the hand and the screen simultaneously.

The transparent support plate may be configured to provide a touch input device which provides, on the side surface, an input coordinates system corresponding to the display range. In this case, the outputting module may be configured to output the coordinates of the tip position as the coordinates of the fingertip point at least in a condition that the touch input device does not detect any touch input, when the tip position is determined as the actual fingertip.

The touch input device has a two-dimensional input surface, and is an input device which provides a continuous two-dimensional location detection similar to a mouse, a trackball, or a track-pad. However, there may be cases in which operations, such as menu selection, a character input, or location selection on a map, are mainly performed. In this case, especially, in the case of an in-vehicle electronic equipment, the main operation is a touching operation to a target which is a key or a button on a screen or a place on a map. Therefore, there is a tendency to avoid continuously motion of a finger while maintaining a contact with the input surface because this motion is easy to cause an erroneous input on a path of the finger. As a result, the motion of the finger becomes a discrete fashion in which the finger is come in contact with the input surface of the panel only at a desired position and the finger is lifted from the input surface of the panel when the finger is moved. The reason why such an input operation is performed is a configuration of a touch input device. In the case of the touch input device, the location detection mechanism on a touch operation surface and the input detection mechanism in the location of choice are unified by a contact detecting mechanism to a touch surface. Therefore, the touch input device does not have an input detection mechanism separately formed from a location detection mechanism like the click button of a mouse. As a result, once an operator's finger is lifted from a touch operation surface, it is impossible to trace the fingertip point. However, according to the above-mentioned configuration, at least in the condition when the touch input device does not detect any touch input, the device outputs the coordinates of the tip position based on an image taken by the imaging device as coordinates of a fingertip point. Therefore, it is possible to know the fingertip position, even if the finger is lifted from the touch input surface.

When an operator's fingertip is placed outside the imaging range, there may be a case in which a portion of the finger remaining within the imaging range may be erroneously determined as a fingertip area. The imaging range may be formed to include a display corresponding area corresponding to the display range, and a display outer rim area formed along outside of the display corresponding area with a predetermined width. The outputting module may be configured to output the coordinates of the tip position as the coordinates of the fingertip point if the tip position located by the tip area locating module is located within the display corresponding area. That is, if an operator's hand image is taken in a form protruding out to a display outer rim area, it is apparent that the actual fingertip is placed outside the display range which is displayed. In this case, the device does not verify the coordinates of the tip position of the extracted image as an actual fingertip point, and does not output it as the coordinates. This configuration can effectively avoid the above problem.

If a pointer image which is not related to the actual finger image in an actual data relationship is attached on the fingertip point determined from the actual finger image, it is necessary to determine a direction of a finger in addition to the position of the fingertip point. In this case, the pointer displaying module may be configured to include a finger direction base setting module and a pointer direction determining module. The finger direction base setting module sets a finger direction base on the coordinates plane which defines a displaying position of the pointer image on the display range. The pointer direction determining module determines a direction of the pointer image based on the finger direction base and the fingertip point. The pointer displaying module displays the pointer image on the display range so that a longitudinal direction of the pointer image is placed along with the direction determined in the pointer, direction determining module and a position of the distal end part of the pointer image is placed on the fingertip point. In this case, another point on a longitudinal direction of the finger other than the fingertip point is located as a finger direction base. A straight line connecting both points can be easily and directly determined as a direction for determining an arranging direction of the pointer image. The straight line may be referred to as a mounting direction of the pointer image or a finger line.

Bones for each one of the fingers are arranged in the form converged towards a wrist joint. Therefore, a position corresponding to a wrist can be utilized as a finger direction base. In this case, it is advantageous in that the pointer image, such as a simulated finger image or an actual finger image, can be displayed in a real shape close to the actual hand. The image data of the hand acquired by the imaging device, such as a camera, is a part of the hand at least including the fingertip. Therefore, the finger direction base setting module may be configured to set the finger direction base on an outside of the display range. In this case, the finger direction base is a wrist position estimated as a position of a wrist. In a case that an image display device disclosed in this specification is used as a user interface device, the user usually place the hand on the imaging range by moving and entering the hand from a side close the operator to the imaging range. Therefore, it is natural to display an image of a hand including fingers on the display range in a manner that a wrist is imaginary placed outside and below the display range.

In this case, the finger direction base setting module may be configured to set the wrist position on a position which is distanced downwardly from the bottom edge of the display range by a predetermined length in a Y-axis, where the Y-axis is a vertical direction of the display range, and an X-axis is a direction perpendicular to the vertical direction. The X-axis is a right and left direction or a horizontal direction. In this configuration, a Y-axis position of the wrist position is defined fixedly on the basis of the bottom edge of the display range regardless of a Y coordinates of the fingertip point. Therefore, it is possible to simplify a setting algorithm for the wrist position. In addition, in a case that the fingertip point exists on the screen on a predetermined range from the wrist position matched with an actual hand size of the operator, it is possible to provide comparatively real feelings about an arranging direction of the pointer image.

However, some input screens requires wide movement between input positions. For example, the input screens, such as a keyboard or a map, has input positions widely distanced in the Y-axis. In such input screens, the wrist position is also moved widely. In this case, the finger direction base setting module may be configured to set the wrist position on the display-coordinates plane so as to have a predetermined spatial relationship with respect to the fingertip point. It is desirable to provide a real feeling about an arranging direction of the pointer image. In detail, the pointer displaying module is configured to display an image of a hand at least including a finger on the display range. In this case, the image of the hand is arranged to have a spatial relationship with respect to the display range in which a wrist is placed outside and below the display range. The finger direction base setting module sets the wrist position on a position which is distanced downwardly from the fingertip point by a predetermined length in the Y-axis, where the Y-axis is a vertical direction of the display range, and an X-axis is a direction perpendicular to the vertical direction.

For example, in a case that a body is fixed, such as sitting down on a seat, a motion of a hand and an arm of the operator for changing operating positions within the input surface can be analyzed in the following movements. Of course, there are certain differences depending on an operator's peculiarity. When moving a fingertip along the X-axis, a motion of an elbow is always relatively small. When moving a fingertip along the X-axis, in many cases, the fingertip is mainly moved with a motion in which the hand is rotated about an rotating axis placed near the center of the hand. Therefore, an angle of the finger direction is also changed according to a rotating angle of the hand, i.e., an X coordinates of a fingertip point.

Therefore, the above-mentioned finger direction base setting module may be configured to set the wrist position so that an X coordinates of the wrist position is adjusted according to an X coordinates of the fingertip point. It is possible to even improve reality about the direction of the pointer image. For example, a standard wrist position may be defined fixedly on a position below the display range. The finger direction base setting module may be configured to determine the X coordinates of the wrist position so that a shifting amount in the X-axis from the standard wrist position is increased as the inclination angle is increased. It is possible to display a pointer image which simulates movement of the hand in the X-axis in a real manner.

As mentioned above, assuming that a center of rotation exists inside a hand, a fingertip will follow on carrying out rotating in the direction of X, and rotating of a wrist position will be carried out to the reverse direction. Therefore, the finger direction base setting module may be configured as follows: for the actual finger image which is inclined in a right up shape with respect to the Y-axis, the finger direction base setting module determines the X coordinates of the wrist position so that the wrist position is shifted to the left side in the X-axis from the standard wrist position; and for the actual finger image which is inclined in a left up shape with respect to the Y-axis, the finger direction base setting module determines the X coordinates of the wrist position so that the wrist position is shifted to the right side in the X-axis from the standard wrist position.

Next, when two or more fingertip points are determined on the display range, the finger direction base setting module may be configured to determine a wrist position which is common for a plurality of fingertip points. This is an approximation algorithm for the wrist position determination which requires a condition in which the directions of fingers converge to a single point on a side to the wrist. There is an advantage to be capable of determining comparatively easily the mounting directions of a plurality of pointer images. In this case, the finger direction base setting module may be configured to determine the X coordinates of the wrist position so that a shifting amount in the X-axis from a standard wrist position is increased as an inclination angle of a representative actual finger image with respect to the Y-axis is increased. The standard wrist position is fixedly defined below the display range. The representative actual finger image has the fingertip point which is located on a highest position in the display range among the fingertip points of a plurality of actual finger images.

In a case of an actual hand, bones for fingers have individual widths at a wrist, therefore, those bones are connected to a wrist joint in a distributed fashion in the X-axis. Therefore, in order to produce a real image, it is preferable to reflect such a distribution of joints. Therefore, the finger direction base setting module may be configured to set a plurality of wrist positions each of which corresponds to one of a plurality of fingertip points determined on the display range. The pointer direction determining module may be configured to determine a plurality of directions for the pointer images based on a respective one of pairs of the fingertip point and the wrist position. In this configuration, it is necessary to determine a wrist position independently for every finger. However, it is possible to determine the mounting directions of the pointer image in a form which faithfully reflects the actual hand form.

In detail, the finger direction base setting module may be configured to determine the X coordinates of the wrist position so that the wrist position is shifted to the right side from the standard wrist position in the X-axis for the fingertip point which is located on the right side from the standard wrist position in the X-axis, and determine the X coordinates of the wrist position so that the wrist position is shifted to the left side from the standard wrist position in the X-axis for the fingertip point which is located on the left side from the standard wrist position in the X-axis. In this case, the finger direction base setting module may be configured to set the wrist position so that a shifting amount of the wrist position from the standard wrist position in the X-axis is increased as an offset amount of the fingertip point from the standard wrist position in the X-axis is increased. It is possible to even improve the degree of approximation to the actual hand.

BRIEF DESCRIPTION OF THE DRAWINGS

Additional objects and advantages of the present invention will be more readily apparent from the following detailed description of preferred embodiments when taken together with the accompanying drawings. In which:

FIG. 12A is a plan view of an image where a fingertip is placed outside the imaging range;

FIG. 12B is a plan view of an image where a fingertip is placed inside the imaging range;

FIG. 12C is a plan view showing a detected position of the fingertip;

FIG. 13A is a plan view of an image where a fingertip is placed outside the imaging range;

FIG. 13B is a plan view showing a detected position of the fingertip in a case of FIG. 13A;

FIG. 13C is a plan view of an image where a fingertip is placed inside the imaging range;

FIG. 13D is a plan view showing a detected position of the fingertip in a case of FIG. 13C;

FIG. 26A is a plan view of an image showing a palm;

FIG. 26B is a plan view of an image showing an angle RD of a palm;

FIG. 26C is a drawing for explaining still another processing for determining a wrist position;

DETAILED DESCRIPTION OF THE PREFERRED EMBODIMENTS

In the following description and drawings, the same reference numbers and symbols are given to components and parts which are the same or similar to that already described in the preceding embodiments. The preceding description may be referenced for the components and parts denoted by the same reference numbers and symbols. Hereinafter, differences from the preceding embodiments are mainly explained in the following embodiments. Other configurations are similar to or the same as that of the preceding embodiments, therefore, unless it is apparent, it is possible to achieve similar or the same functions and advantages as described in the preceding embodiments.

Figure 1:
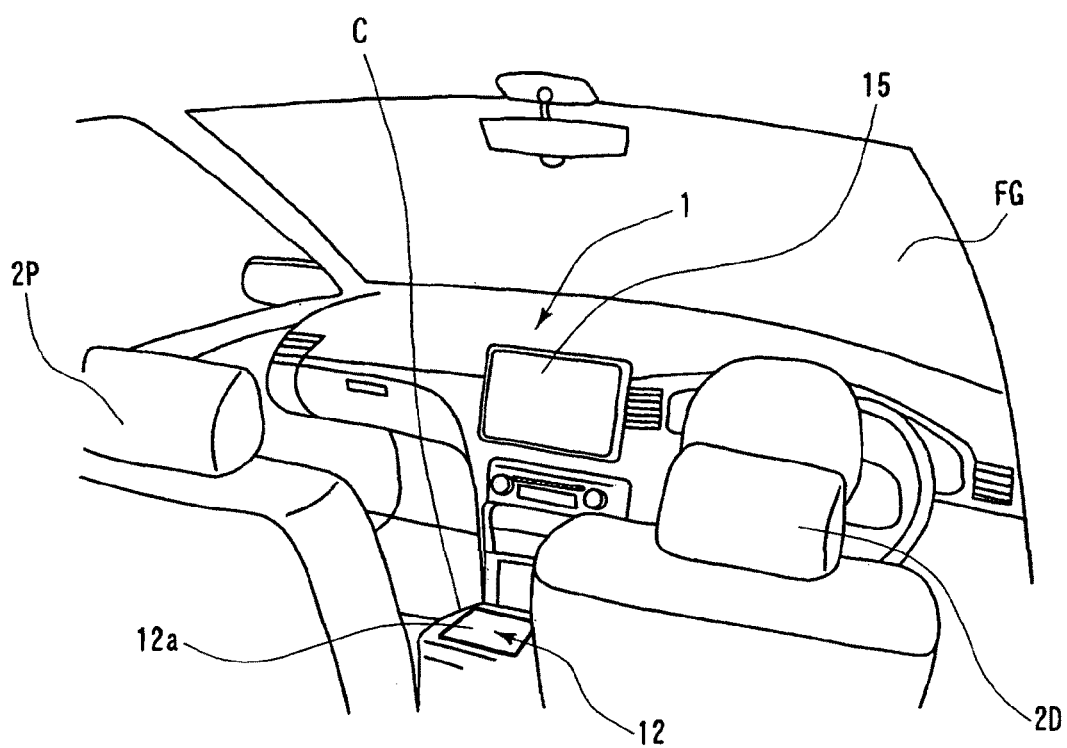
FIG. 1 is a perspective view of a user interface device mounted on a vehicle according to an embodiment of the present invention.

FIG. 1 is a perspective view of a user interface device mounted on a vehicle according to an embodiment of the present invention. The user interface device 1 is disposed in the passenger compartment of a vehicle. The device 1 includes an input device 12 and a monitor 15. The input device 12 is disposed on a center console C between a driver seat 2D and a passenger seat 2P. The input device 12 is disposed on a position where either one of a driver or a passenger can operate it. The monitor 15 is disposed on a center of an instrument panel of the vehicle. The monitor 15 may be referred to as a display device 15. The purpose of the user interface device 1 is not limited. For example, the user interface device 1 may be used for operating functions of a device mounted on the vehicle, such as a car navigation system and a car audio system. The user interface device 1 enables the operator to operate the device while looking at the screen of the monitor 15.

The input device 12 is disposed so that an input surface is placed upwardly. The input surface is provided by an upper surface of a well-known touch panel 12a. The touch panel 12a may employ any type of touch detection method, such as a resistive type, a surface acoustics wave type, and a capacitive type. The touch panel 12a includes a transparent support plate of which substrate is made of a transparent resin plate or a glass plate. The touch panel 12a has an upper surface which is touched by a finger of the operator. The touch panel 12a receives pressure from the finger and inputs a touching operation of the finger as an input command. The touch panel 12a provides an input coordinates system defined on the upper surface thereof. The input coordinates system corresponds to a display range of the monitor 15. The touch panel 12a provides a restricting member which restricts an imaging distance of an imaging device, i.e., a camera 12b, to a hand as an object in a predetermined distance. The restricting member is disposed in a fixed manner to satisfy a predetermined spatial relationship with respect to the imaging device. The restricting member includes a transparent support plate which is capable of supporting the hand to be imaged on one side surface thereof. The imaging device takes the image of the hand through the transparent support plate from the other side surface of the transparent support plate. The transparent support plate is a component of the touch panel 12a, i.e., a touch input device, which provides, on the side surface, an input coordinates system corresponding to the display range.

Figure 2:
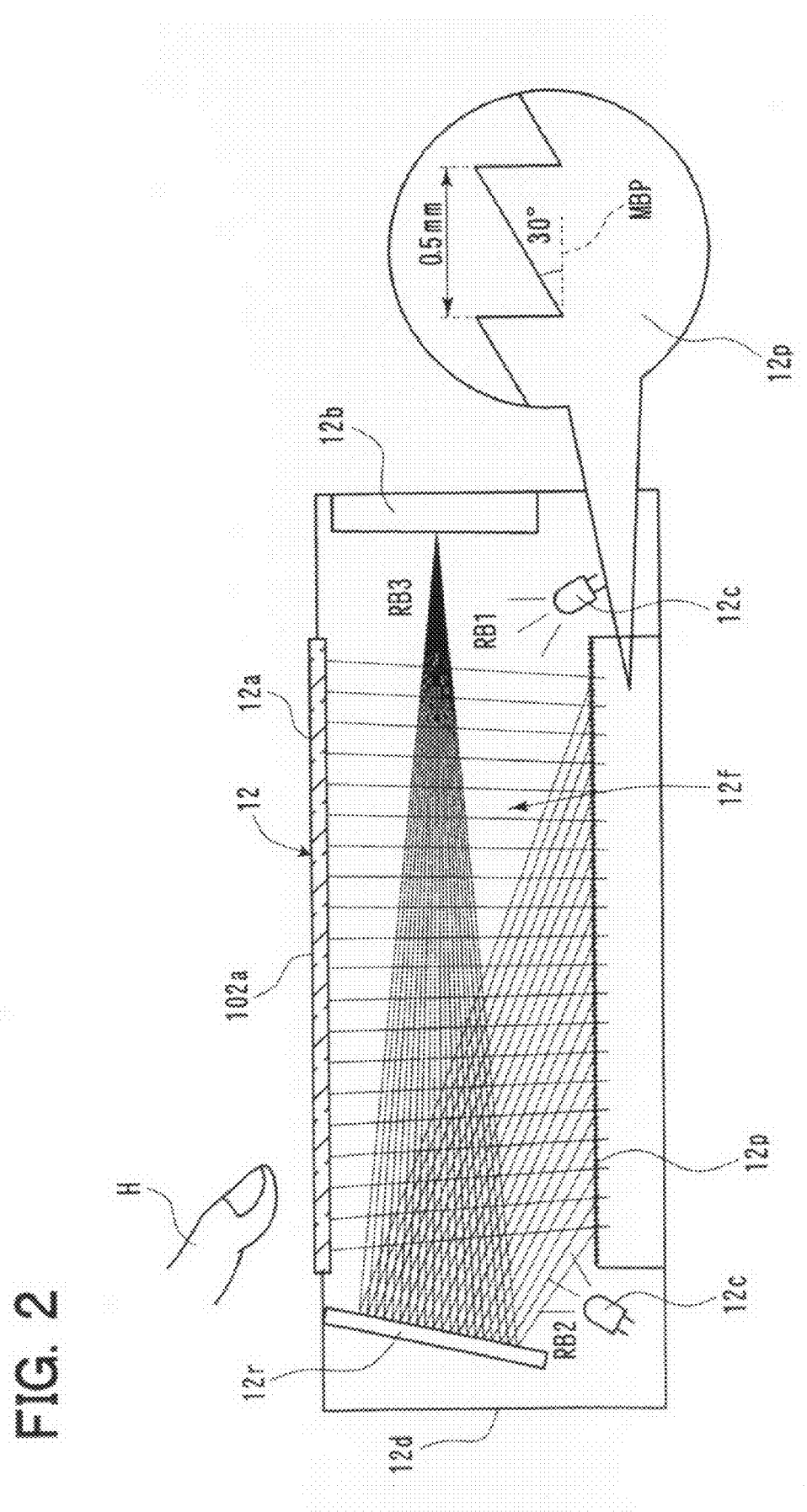
FIG. 2 is a cross-sectional side view of an input device according to the embodiment of the present invention.

FIG. 2 is a cross-sectional side view of an input device according to the embodiment of the present invention. The touch panel 12a is placed on a top side of a case 122e so that an input surface 102a is placed on a top. The input device 12 provides an imaging module. The input device 12 has a case 12d. The input device 12 includes an imaging optical system disposed in a case 12d. An illumination light source 12c is disposed in the case 12d. A camera 12b for taking and capturing an image through the touch panel 12a is also disposed in the case 12d. The camera provides an imaging device. The illumination light source 12c is a light emitting diode light source which has brightness directivity toward an upper side of elements improved by a mold in a convex surface form. The illumination light source 12c includes a plurality of elements which are arranged to surround the bottom surface of the touch panel 12a. The illumination light source 12c provides a monochromatic light source. The illumination light source 12c is disposed in a tilted form to direct a distal end part of the mold toward the bottom surface of the touch panel 12a. In other words, a high-intensity part of the illumination light source 12c is directed toward the bottom surface of the touch panel 12a. The illumination light source 12c is disposed so that a primary imaging reflection light RB1 reflected by a hand H on the input surface 102a is created downwardly passing through the touch panel 12a.

The imaging optical system has a first reflective portion 12p and a second reflective portion 12r. The first reflective portion 12p is a prism plate which disposed directly under the touch panel 12a and opposite to the touch panel 12a. The prism plate 12p is a board made of transparent material. The prism plate 12p has a surface on which a plurality of micro prisms with triangle cross-sectional shape are arranged in parallel. The prism plate 12p receives the primary imaging reflection light RB1 from the hand H, and reflects the light RB1 in an oblique upward direction to a side part of a gap 12f between the prism plate 12p and the touch panel 12a. The light reflected by the prism plate 12p is indicated as a secondary imaging reflection light RB2. The prism plate 12p is one of a light guiding member. The second reflective portion 12r is a plane mirror arranged on the side part of the gap 12f. The second reflective portion 12r is referred to as a plane mirror 12r. The plane mirror 12r receives the secondary imaging reflection light RB2, and reflects the light RB2 toward the other side of the gap 12f. The light reflected by the plane mirror 12r is indicated as a third imaging reflection light RB3. The plane mirror guides the third imaging reflection light RB3 to the camera 12b placed on the other side of the plane mirror 12r. The plane mirror 12r is one of a light guiding member. The camera 12b is disposed on a position corresponding to the focus of the third imaging reflection light RB3. The camera 12b takes and captures an image of the hand H including a finger.

An enlarged view of the prism plate 12p is shown in a circle in FIG. 2. Each one of the micro prisms are formed in a rib shape which has a reflection surface inclined in a predetermined angle with respect to a mirror base plane MBP. The micro prisms are formed closely adjacent to each other to be parallel to each other along the mirror base plane MBP. The prism plate 12p is capable of reflecting an entering light along the normal line to a side direction, i.e., an oblique direction, without inclining the mirror base plane MBP. Therefore, it is possible to dispose the first reflective portion 12p for a side reflection under the touch panel 12a in a parallel opposing arrangement. This arrangement provides reduced height in a height direction of the gap 12f.

In addition, the second reflective portion 12r and the camera 12b are disposed on both sides of the gap 12f in an opposing manner. As a result, the third imaging reflection light RB3 directly entering into the camera 12b can be guided across the gap 12f in a lateral direction. Thereby, the second reflective portion 12r and the camera 12b can be closely disposed on the side of the touch panel 12a. The optical path of the imaging reflection light from the hand H to the camera 12b is formed within the gap 12f in a folded shape of three paths. Therefore, it is possible to provide the input device with compact arrangement of the imaging optical system. Also it is possible to make the case 12d in a thinner shape. A dramatic miniaturization and slimming down of the input portion 12 whole can be realized by reducing the size. It is also possible to reduce the size of the touch panel 12, i.e., vertical and horizontal dimensions of the input surface 102a. It is possible to attach the input device 12 without trouble to a vehicle whose width of a center console C, see FIG. 1, is comparatively small, or a vehicle whose attaching space is limited only for a part on a front side of a shift lever.

The input surface 102a of the touch panel 12 corresponds to the imaging range 102b of the camera 12b. The length in a vertical direction, i.e., the Y-axis direction, of the input surface 102a is defined so that only a part of a hand, assuming an average size hand of an adult, in a longitudinal direction at least including a fingertip of the middle finger can be placed within the input surface 102a. For example, a vertical length may be in a range from 60 mm to 90 mm. For example, the vertical length may be 75 mm. Thereby, only an end part extending from a root part of a finger is displayed on the display range of the monitor 15. As a result, a shape of a hand other than a finger does not affect displaying process, therefore, it is possible to simplify displaying process using the image taken by the camera 12b. The length in a lateral direction, i.e., the X-axis direction, of the input surface 102a is in a range from 110 mm to 130 mm. For example, the lateral length is 120 mm. The lateral length is set so that the index finger, the middle finger, the third finger, and the little finger can be placed within the imaging range, and the thumb is placed the outside of the imaging range, when the hand is placed on the input surface 102a while spreading fingers widely. The imaging range has a size capable of imaging only a part of fingers on a distal end part of a hand of an average adult, when the hand of the average adult is placed so that the imaging distance to the hand is restricted and the fingers are stretched. The part of the fingers is formed by the index finger, the middle finger, the third finger, and the little finger. However, if the fingers are closed suitably, all of the fingers may be placed within the imaging range.

Figure 3:
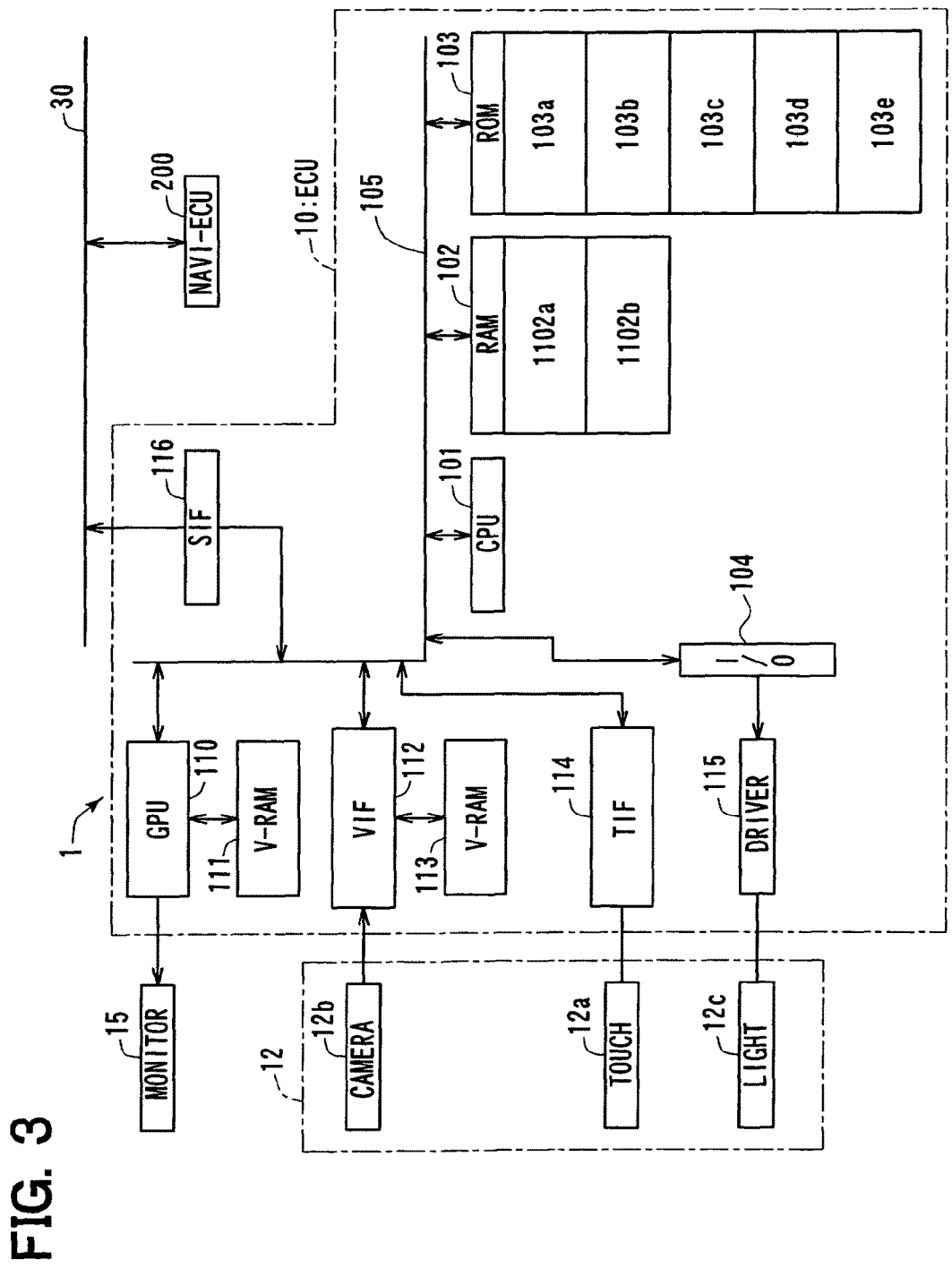
FIG. 3 is a block diagram showing an electronic configuration of the user interface device according to the embodiment of the present invention.

FIG. 3 is a block diagram showing an electronic configuration of the user interface device according to the embodiment of the present invention. An operation ECU 10 performs main part of control for the user interface device 1. The operation ECU 10 is constructed as a computer hardware board which has a CPU 101 as a main component. In detail, the ECU 10 includes the CPU 101, one or more of RAM 1102, and one or more of ROM 103. The ECU 10 further includes a graphic controller (GPU) 110, a video interface (VIF) 112, a touch panel interface (TIF) 114, an input/output interface (I/O) 104 for general purpose, and a serial communication interface (SIF) 116. In the ECU 10 those components are connected via an internal bus line 105. The graphic controller (GPU) 110 is connected with a video RAM (V-RAM) 111 for a display and a monitor (display device) 15. The video interface (VIF) 112 is connected with a video RAM (V-RAM) 113 for taking and capturing an image and a camera 12b for taking image on the input surface. The touch panel interface (TIF) 114 is connected with the touch panel 12a. The general purpose input/output interface (I/O) 104 is connected with the illumination light source light 12c through the driver (drive circuit) 115. The serial communication interface (SIF) 116 is connected with a serial communication bus 30, such as the Controller Area Network communication bus. The serial communication bus 30 is connected with other electronic control unit, such as a car-navigation ECU 200 which controls a car-navigation system. Therefore, the operation ECU 10 can communicate with the other ECUs via the serial communication bus.

An analog or digital video signal from the camera 12b is continuously inputted into the video interface 112. The video interface 112 retrieves and stores an image frame data into the video RAM 113 in a predetermined interval. The stored content of the video RAM 113 is updated in response to retrieving a new image frame data.

The graphic controller 110 retrieves an input screen image frame data from the car-navigation ECU 200 through the communication interface 116. The graphic controller 110 also retrieves a pointer image frame data in which a pointer image is attached on a determined position from the CPU 101. The graphic controller 110 performs a frame composition of the input screen image frame data and the pointer image frame data by using well-known processing, such as an alpha blending processing on the video RAM 111, and outputs the frame data to the monitor 15.

The touch panel interface 114 has a drive circuit according to the type of the touch panel 12a. The touch panel interface 114 detects an input position on the input surface 102a by a touch operation based on a signal input condition from the touch panel 12a. The touch panel interface 114 outputs the detection result as coordinates information for the input position.

A predetermined relationship by two-dimensional coordinates is uniquely provided between the imaging range of the camera 12b and a display range of the monitor 15. The same or similar relationships are provided between an image taken by the camera 12b and a set of data including an input image frame data and a pointer image data which define display image. The monitor 15 provides a display device having a display range which is related to the imaging range by coordinates.

The ROM 103 is a storage medium for storing the following software, i.e., program, which can be executed by the CPU 101. The software may be stored in other storage medium, such as a hard disk drive, or a memory device.

103a: Touch-Panel Control Software

The software 103a retrieves input position coordinates from the touch panel interface 114, and retrieves information of determination and reference for operation input which is transmitted from the navigation ECU 200 with input screen image frame data. For example, the information includes information for determining and identifying an area of software-key, and contents of an operating command which should be outputted when a touch operation is performed on the software-key. The software 103a determines present contents of an operating input based on the input position coordinates and the retrieved reference information, and outputs an execution command of corresponding operation to the navigation ECU 200.

103b: Display Control Software

The software 103b performs control for retrieving the input screen image frame data by instructing to the graphic controller 110. The software 103b also transmits the pointer image frame data created by the below-mentioned method to the graphic controller 110.

103c: Fingertip Calculating Software

The software 103c makes the device to perform as a tip area detecting module, a tip area locating module, and a verifying module. The software 103c performs by using a memory region 1102a of the RAM 1102 for a fingertip point computing treatment. The software 103c performs a binarization of an image of a hand which is taken by the camera 12b. The software 103c performs a determination in which a fingertip position of the actual finger image is determined as a fingertip point. In detail, the software 103c performs a calculation in which a predetermined representative point of the tip area Ta in the insertion direction on the image which is binarized is detected and is determined as the tip position Tp, i.e., the fingertip point Tp. The representative point is a geometric center-of-gravity position. The software 103c makes the device to perform as a verifying module which verifies that whether the tip position indicates a position of an actual fingertip based on at least one of a size of the tip area and an area of the tip area. The device may include a pixel binarizing circuit installed on an output stage of a video interface, and may perform binarizing processing of the image of a hand by the pixel binarizing circuit in advance.

103d: Pointer Image Composition Software

The software 103d makes the device to perform as a fingertip point displaying module and/or a pointer displaying module. The software 103d performs by using a memory region 1102b of the RAM 1102 for a pointer image composition. The software 103d performs processing which attaches a pointer image created based on a pointer image data 103e on a pointer image frame so that a fingertip part of the point image is placed on the fingertip point. Those software provide a fingertip point displaying module which displays the actual fingertip point on the display range in a visible manner.

Figure 23A:
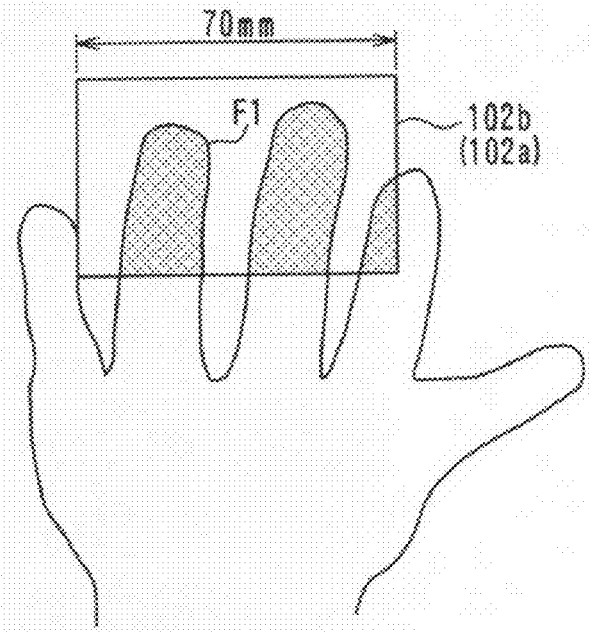
FIG. 23A is a plan view showing a reduced area of an input surface and a hand.
Figure 23B:
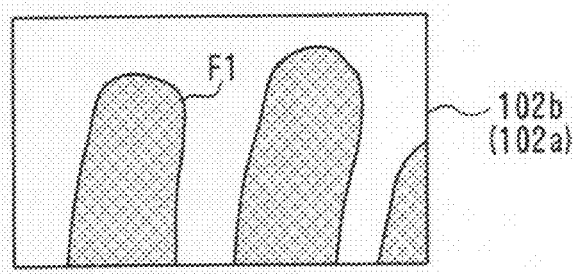
FIG. 23B is a plan view showing an image in the case of FIG. 23A.
Figure 23C:
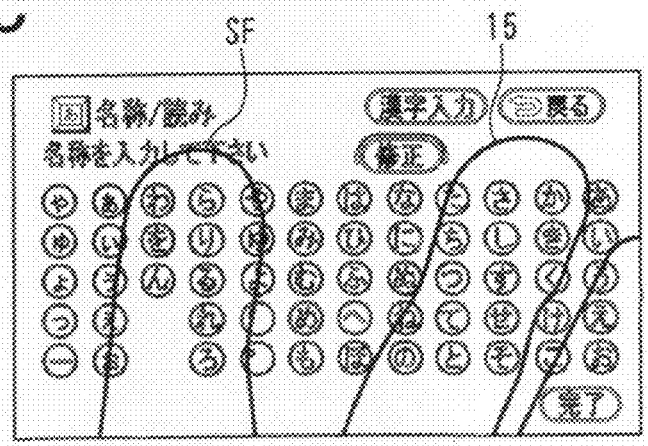
FIG. 23C is a plan view of a display image which displays a keyboard and a finger-shaped pointer image in an overlapping manner.

Hereafter, operation of the user interface device 1 is explained based on flowcharts mainly focusing on processing for determining and locating the fingertip point, i.e., the fingertip position, of the hand imaged. Main part of the processing is carried out by the software 103c. Before beginning the processing, the user interface device 1 is activated by a preceding command input from an operator. For example, a touch input operation on another screen may generate the command input. In response to the command input, the monitor 15 displays an initial image on a screen. The initial image includes a software key board as shown in FIG. 23C. Although FIG. 23C shows a hand image SF, the initial image does not include the hand image SF. Alternatively, the initial image be an input image for other purpose, such as an image of map for the car-navigation system.

Figure 4:
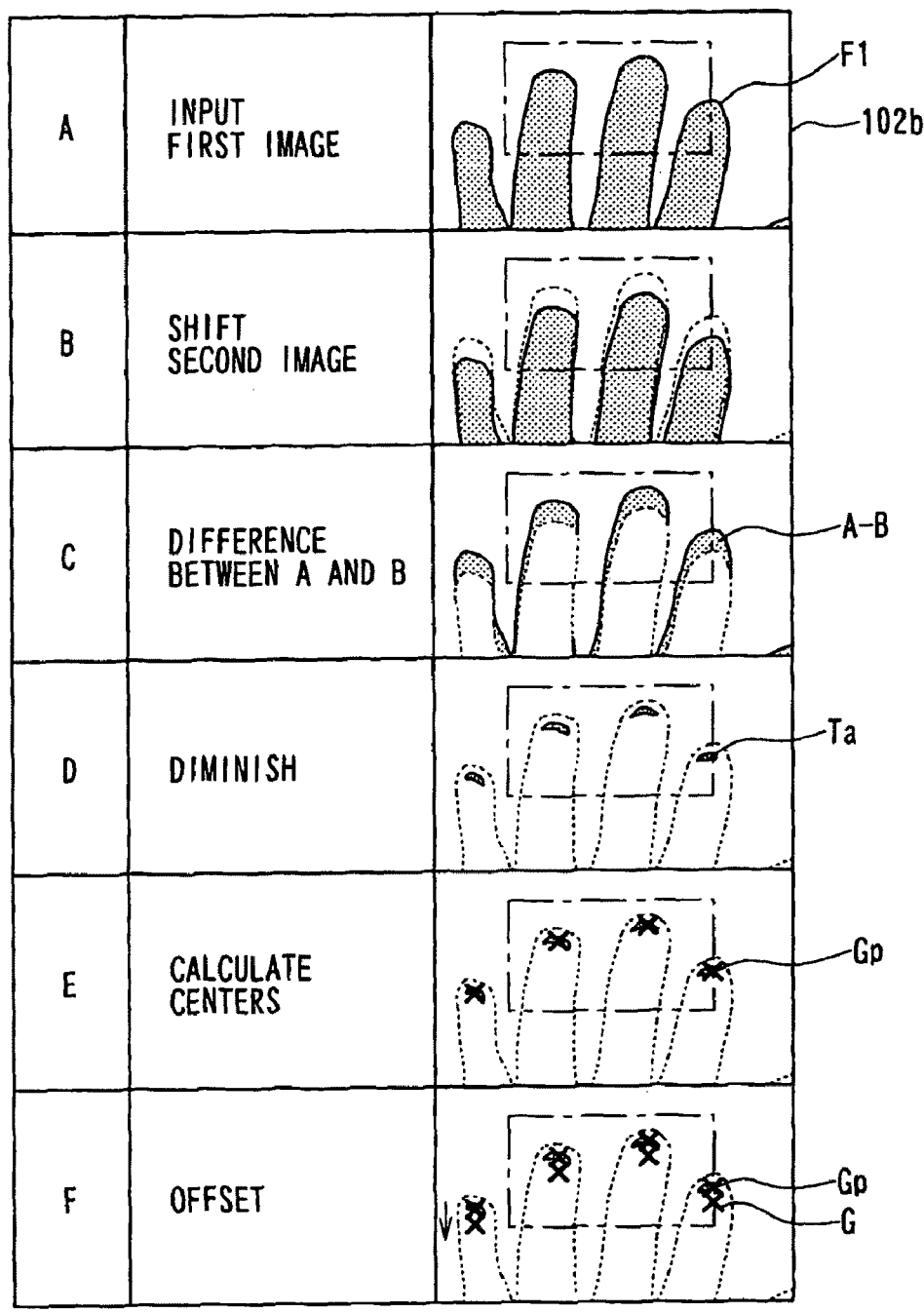
FIG. 4 is a drawing which shows processing for determining fingertip positions.
Figure 5:
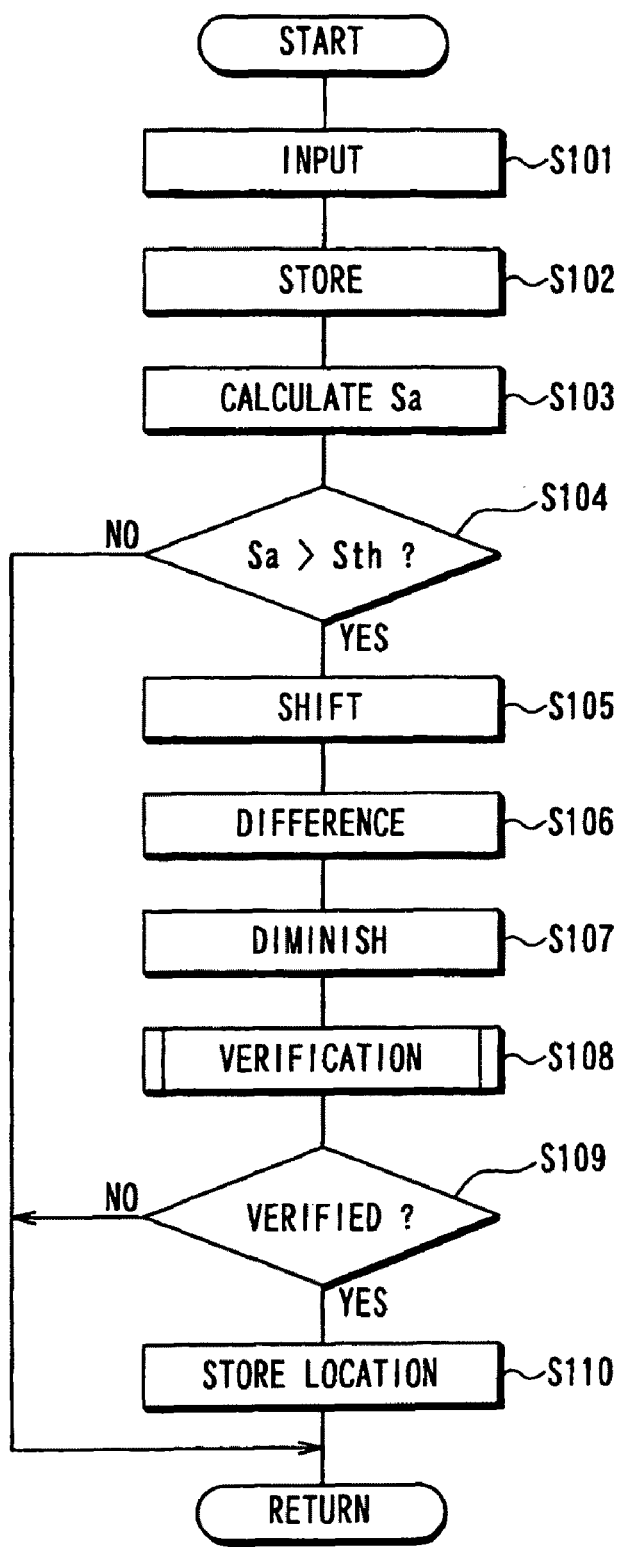
FIG. 5 is a flowchart showing processing for locating fingertips.

FIG. 4 is a drawing which shows processing performed on an image for determining fingertip positions. FIG. 5 is a flowchart showing processing for locating fingertips.

The fingertip locating processing is performed repeatedly in a predetermined cycle. In the above-mentioned condition, if the hand H is brought close to the input surface 102a of the touch panel 12a as shown in FIG. 2, the camera 12b takes and captures an image of the hand H based on the reflection light caused by the lighting light from the illumination light source 12c. In a step S101, the device retrieves the image. Hereinafter, each one of steps in flowcharts is referenced by the symbol "S" and the numbers. The pixels corresponding to the hand are obtained by the reflection light, therefore, the pixels corresponding to the hand appear more brightly than a background region. Therefore, it is possible to separate the image into two parts, one is an object area, and the other one is a background area. In this embodiment, as shown in an image "A" in FIG. 4, the brightness of the pixels are binarized by an appropriate threshold level. For example, a pixel having a value "1" corresponding to a high intensity shows the object area which is illustrated in a masked or black area. A pixel having a value "0" corresponding to a low intensity shows the object area which is illustrated in a background or white area. In the input image "A", a hand of the operator or a finger F1 is illustrated as a dark area. In S102, the image data which is binarized is saved as the first image data "A".

In S103, a ratio Sa of the object area in the first image data is calculated. When no object exists in the imaging range of the camera 12b, the ratio Sa would be less than a predetermined threshold value Sth. If the ratio Sa is equal to or less than the threshold value Sth, the device skips the following steps. If the ratio Sa is greater than the threshold value Sth, the device proceeds to the next step.

In S105, the device creates a second image data "B" by shifting the first image data "A" along a longitudinal direction of the hand, i.e., along the Y-axis. The first image data "A" is shifted by a predetermined length, which may be in a range from 20% to 80% of a distal end part from a first joint of the middle finger. The shifting length may be in a range from 5 mm to 20 mm. The device stores the image data as a shifted image "B" as shown in FIG. 4. In the shifted image "B", the shifted image of the finger F1 is illustrated as a dark area. The original outer edge of the finger F1 in the input image "A" is illustrated with a broken line. In S106, as shown in a difference image "C" of FIG. 4, the device creates an image showing a non-overlapping area which appears in a fingertip side when both-images "A" and "B" are overlapped. Then, the device determines that the non-overlapping area as a tip area Ta in the insertion direction of the hand. The tip area may be called as the tip region. Here, the tip area is a possible area for an actual fingertip area. If there are some non-overlapping areas, a plurality of tip areas are detected. The tip area can be easily detected as the non-overlapping area by overlapping the original image and the shifted image and calculates the difference between them. Even if some fingers are closely located, it is possible to detect each of the tip areas separately because each of the fingertip areas are rounded. In the difference image "C", the difference between the images "A" and "B" is illustrated as a dark area.

The difference image "C" in FIG. 4 is created based on the second image data "B" which is created by downwardly shifting the first image data "A" toward the wrist along the Y-axis. The non-overlapping area which appears in the fingertip side of the first image data "A" is determined as the tip area. In this case, it is possible to determine the fingertip area on the first image data "A" where a relative correspondence on the coordinates system to the imaging range is maintained. As a result, relative correspondence on the coordinates system to the display range of the monitor 15 is also maintained. Therefore, it is possible to simply the following processing for determining coordinates of a point on the imaging range and the display range.

The first and second image data are binarized. The non-overlapping area is determined by calculating image difference between the first image data and the second image data. Thereby, the processing which determines the pixel of the non-overlapping area can be converted into a logic operation between the corresponding pixels on the first and the second image data. In detail, if the Exclusive-OR result between corresponding pixels is "0", then, the pixel can be determined as a pixel of the non-overlapping area. The non-overlapping area of the first and the second image data may be produced in a narrow shape along a side of a finger. However, such narrow shape can be easily eliminated from the difference image "C". For example, the device may perform processing in which if the number of pixels of "1" continuously arranged along the X-axis is less than a predetermined number, those pixels are turned into "0".

Next, in S107, diminishing processing is performed on the image showing the tip area, as shown in FIG. 4. As a result, the difference image "C" is processed into a diminished image "D" shown in FIG. 4. In the diminishing processing, pixels on an outer region of the tip area are turned into "0". In detail, the device selects one of the pixels valued "1" as a target pixel. Then, if at least one of contiguous pixels in a predetermined adjacent relationship to the target pixel has an opposite value, "0", the device turns the target pixel into "0". For example, the contiguous pixels are eight pixels surrounding the target pixel. The processing is performed for at least the pixels valued "1". As a result, the area of the tip area is diminished. The diminishing processing may be performed repeatedly if needed.

Figure 8:
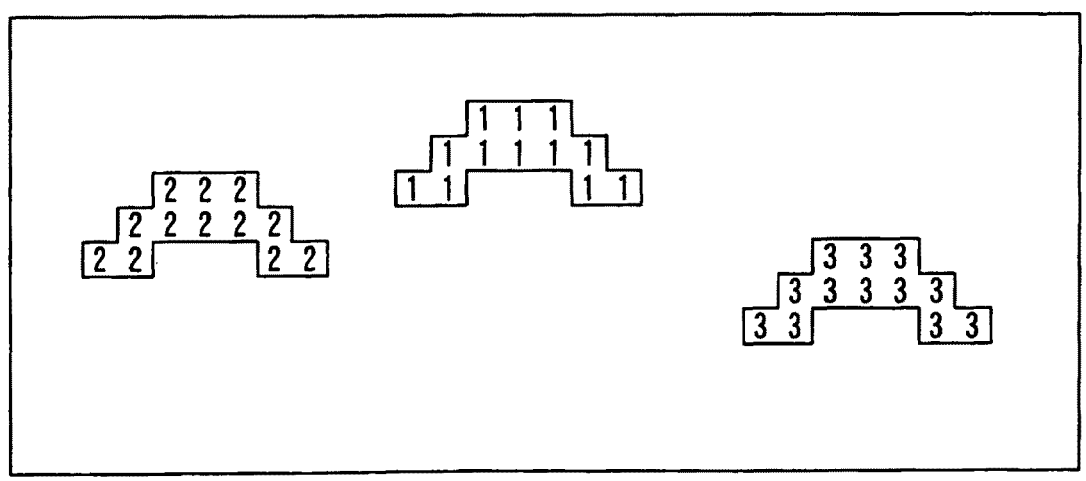
FIG. 8 is a plan view of an image showing pixels labeled with different labeling numbers for identifying a plurality of tip areas.

FIG. 8 is a plan view of an image showing pixels labeled with different labeling numbers for identifying a plurality of tip areas. Then, the device performs process for separating respective tip areas on an image data after completing diminishing process. In FIG. 8, three tip areas are identified by reference numbers 1, 2, and 3. For this purpose, the device scans the image along a predetermined direction, i.e., the X-axis, for evaluating the pixels of "1" are considered continuously arranged or not. The device determines that whether the pixels can be grouped in a tip area or should be separated as two tip areas, based on the value of the contiguous pixels. For example, the device determines, during the scanning, that whether an absence of pixel of "1" is repeated for a predetermined number of pixels or not. For example, if an absence of pixel of "1" is repeated for three times continuously, then, the device may consider there are two separate tip areas. The device puts labeling numbers on the pixels to identify each tip areas. In the second and later lines of scanning, the device detects switching of the value of adjacent pixels during the scanning. If the value of pixel is switched from "0" to "1", the device evaluates the value of eight pixels surrounding the object pixel. If at least one of pixels with the labeling number is detected, the device puts the same labeling number to the object pixel. If no pixel with the labeling number is detected, the device puts a new labeling number to the object pixel. As a result, it is possible to identify the tip areas with different labeling numbers as different tip areas.

Figure 7:
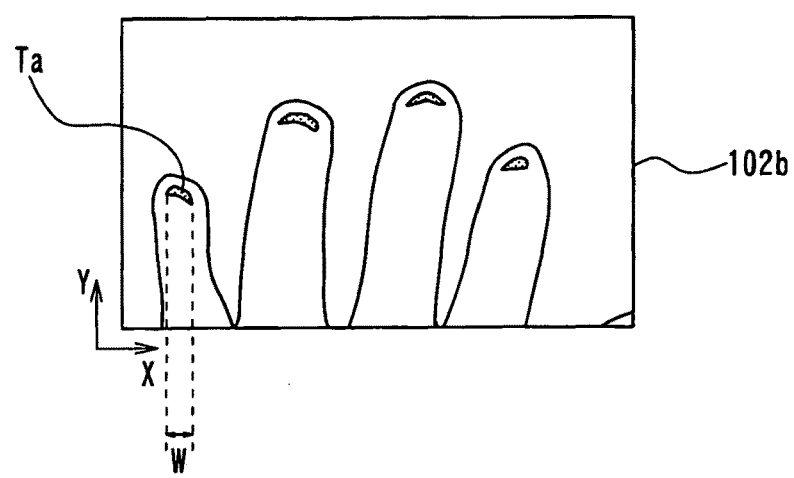
FIG. 7 is a plan view of an image showing a plurality of tip areas.

Next, the routine proceeds to S108 and performs verification processing for determining whether each tip area separated and identified is an actual fingertip area or not. The processing may be also referred to as a fingertip verification step. FIG. 7 is a plan view of an image showing a plurality of tip areas, which indicating a tip area Ta and a width W thereof.

A main part of the verification processing includes processing in which a tip area Ta determined as an object is verified as an actual fingertip area when a necessary condition is satisfied. The necessary condition is that a size "L" of the finger width direction of the tip area Ta is in a predetermined range which is defined based on a common adult's finger width size. The predetermined range is defined with an upper limit Wth1 and a lower limit Wth2. The finger width may be simply referred to as the width. As shown in FIG. 1, the input device 12 and the monitor 15 are installed on a side of the seat where an operator sits down, and on a slightly forward position from the operator. Therefore, the operator inserts a hand onto the imaging range 102b while looking at the monitor 15 arranged on the instrument panel. The hand is inserted on the input surface 102a of the touch panel 12a arranged on the center console C from a back side in a longitudinal direction, i.e., a forwarding direction, of the vehicle. In other words, the hand is inserted from a close side to the operator sitting down on the seat. Furthermore, in other words, the hand is inserted onto the imaging range 102b of the camera 12b which takes an image of the hand on the input surface 102a from the bottom side thereof in a forward direction from a back side edge of the imaging range 102b. As a result, the hand is usually placed so that a wrist of the hand is placed close to the back side edge of the imaging range 102b, and a fingertip is placed in the imaging range 102b. Therefore, an insertion direction of a hand is assumed in a direction intersecting perpendicularly with the longitudinal side edge of the imaging range 102b which is formed in an oblong rectangular shape. Therefore, the insertion direction is a direction along the Y-axis. The finger width direction is a direction intersecting perpendicularly with the insertion direction of the hand on a field of the input surface 102a. That is, the finger width direction is a direction corresponding to the longitudinal side edge of the imaging range 102b. Therefore, the insertion direction is a direction along the X-axis. That is, the width of the tip area Ta is fixedly measured along the X-axis, i.e., the longitudinal side edge of the imaging range 102b.

Figure 6:
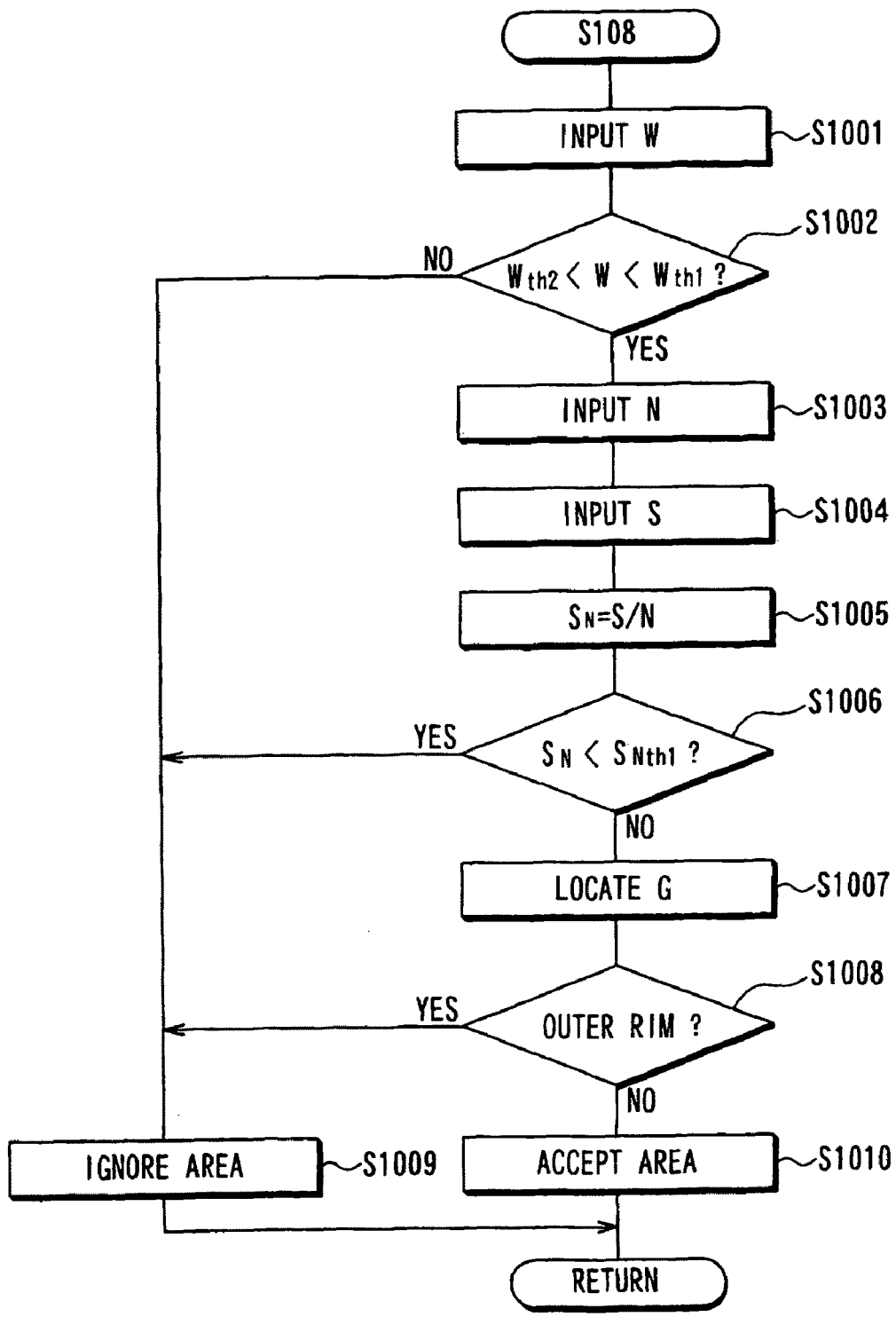
FIG. 6 is a flowchart showing processing for determining whether an object image is a fingertip or not.

FIG. 6 is a flowchart showing processing for determining whether a tip area is a fingertip or not. In other words, FIG. 6 shows verifying processing for an actual fingertip.

In S1001, the device detects the width W of each tip area Ta separated and located. That is, the apparatus inputs the width W. In detail, the width W can be calculated based on an expression W=Xmax−Xmin, where Xmin is the minimum value, and Xmax is the maximum value among X coordinates of pixels forming the tip area Ta. In S1002, it is determined that whether the width W of the tip area Ta determined as mentioned above is in the above-mentioned predetermined range or not. The upper limit is Wth1. The lower limit is Wth2. The touch panel 12a is arranged on the center console C. The driver and passenger sitting down on the seats often use the center console C for putting and holding something. At this time, a something other than a hand may be placed on the input surface 102a of the touch panel 12a, i.e., on the imaging range 102b. In this case, an image of a something other than a hand is taken by the camera 12b instead of the hand of the operator.

Figure 9A:
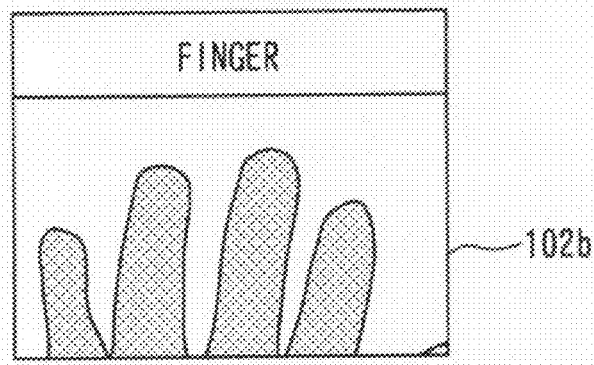
FIG. 9A is a plan view showing a first example of an image.
Figure 9B:
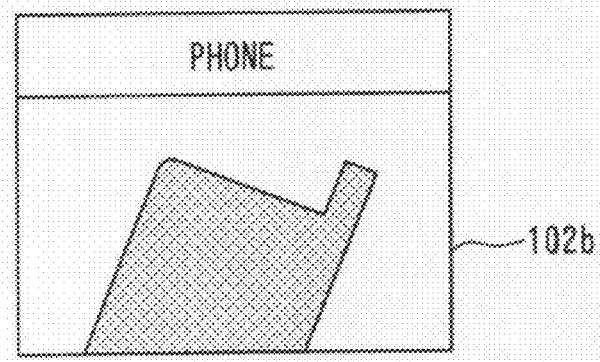
FIG. 9B is a plan view showing a second example of an image.
Figure 9C:
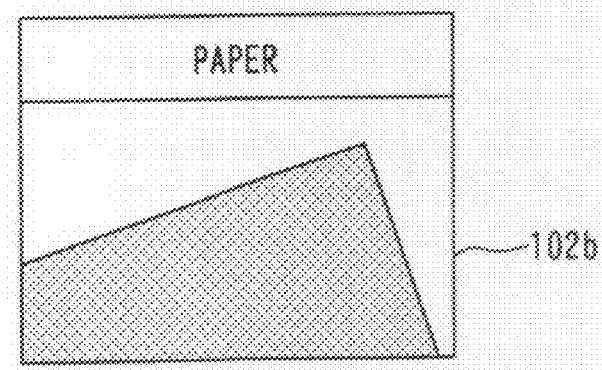
FIG. 9C is a plan view showing a third example of an image.

FIG. 9A is a plan view showing a first example of an image, which shows a hand. FIG. 9B is a plan view showing a second example of an image, which is a mobile phone. FIG. 9C is a plan view showing a third example of an image, which is a paper or a book. FIGS. 9A, 9B, and 9C are binarized images.

An outline of a mobile-phone or documents is far simpler than an outline of a hand, and are apparently different. However, if a method disclosed in the patent document 2 is performed, a complicated shape of an outline of a hand is approximated and transformed into a simple ellipse. The patent document 2 discloses an approximation based on an ellipse circumscribed to an outline. Therefore, according to the method disclosed in the patent document 2, information of an outline is ignored. As a result, it is difficult to distinguish a hand from goods which have simple shape, such as a mobile-phone and documents. On the other hand, the patent document 3 discloses a method in which an outline is detected by approximating the outline by a higher order function. However, it is difficult to directly determine that whether the outline shows an actual finger or not based on coefficients of the higher order function. In the method disclosed in the patent document 4, a circumscribed rectangle of an image is divided into two or more sub-rectangular areas, and it is determined that whether it is an image shape which is not necessary for calculating a fingertip coordinates based on a ratio of the areas of the sub-rectangular areas. According to the method disclosed in the patent documents 4, in a case that a image of goods other than a hand is taken, if the ratio of the areas of the goods is accidentally similar to a ratio of a hand, it is impossible to distinguish the goods from the hand.

Figure 10A:
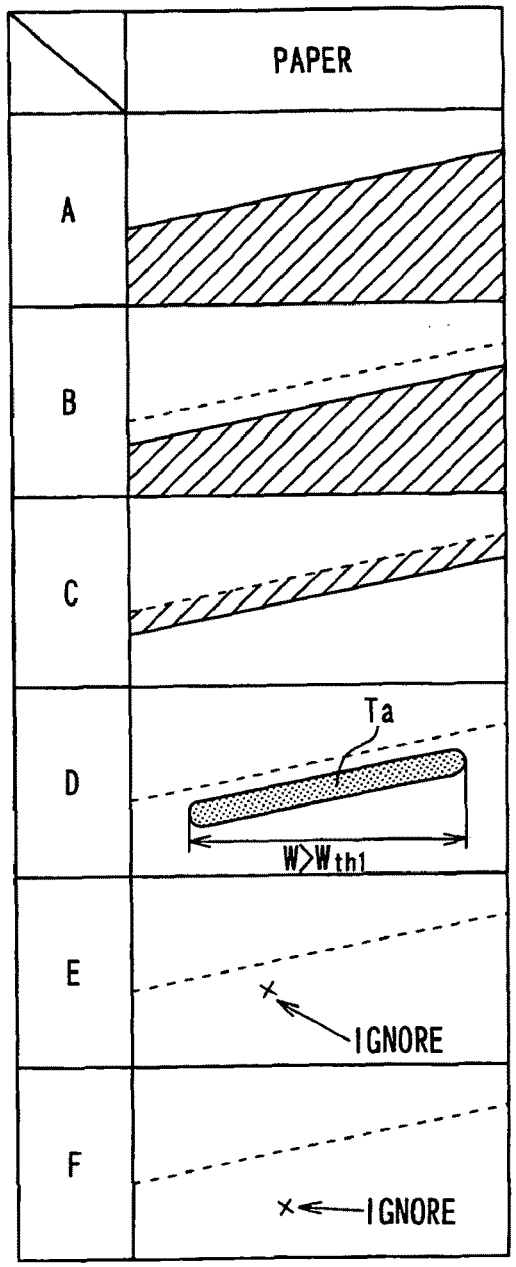
FIG. 10A is a drawing which shows processing for determining a tip area to be ignored.
Figure 10B:
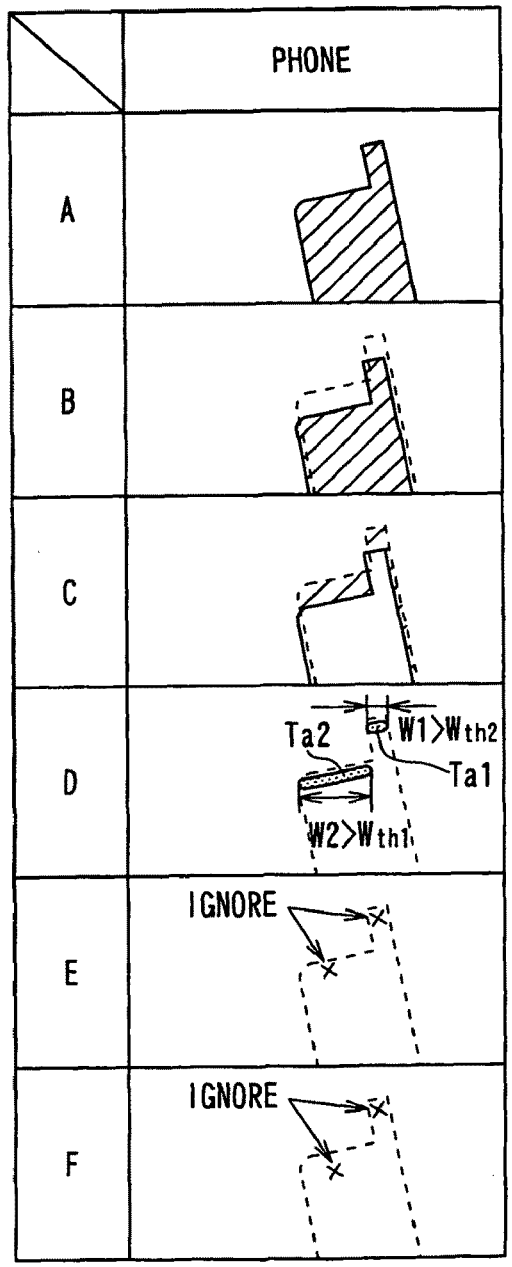
FIG. 10B is a drawing which shows processing for determining a tip area to be ignored.

FIG. 10A is a drawing which shows processing for determining a tip area to be ignored. FIG. 10B is a drawing which shows processing for determining a tip area to be ignored. An input image "A" is a first image which is imaged by an imaging device. A shifted image "B" is a second image which is obtained by shifting the first image "A" in the Y-axis in a parallel manner. A difference image "C" is obtained by calculating the difference between the first image and the second image. The difference image "C" contains information indicative of a tip area Ta. A tip area to be ignored can be determined by using a determining method in which a width W of the tip area Ta is used. A processed image "D" shows the tip area Ta and the width W. Images "E" and "F" show ignored points which are detected as points corresponding to the finger tips but are also determined to be ignored. Assume that a determining method using a width W of the tip area is employed. In this case, if a document or a book is placed as shown in FIG. 10A, it is possible to determine that it is a non-fingertip area certainly, because the width W of the tip area Ta, detected apparently greater than an upper limit Wth1 of a predetermined range which is determined based on an ordinary adult finger width. If a mobile-phone is placed as shown in FIG. 10B, a width W1 of a first tip area Ta1 which is derived from a protruding antenna portion is apparently narrower than a finger. The width W1 is less than the lower limit Wth2 of the predetermined range. A width W2 of a second tip area Ta2 which is derived from a main part of the mobile-phone wider than a finger exceeds the upper limit Wth1 of the predetermined range. Therefore, it is possible to determine that the both tip areas Ta1 and Ta2 are non-fingertip areas.

Even if an actual hand is imaged by the camera 12b, there may be some exceptional cases. One exceptional case is that a hand is placed on the imaging range 102b while stretching one or two fingers and bending the remaining fingers. For example, the index finger alone or a pair of the index finger and the middle finger is stretched and the remaining fingers are grasped into a fist form. In this case, there may be that a width of a tip area of the bent fingers exceeds the upper limit Wth1 of the predetermined range, and a width of tip areas of the stretched fingers are within the predetermined range. The device may be configured to determine the above case as an actual finger. For example, in a case that a plurality of tip areas are detected and extracted, if at least one of the tip areas is within the predetermined range, the device determines the tip area as the actual fingertip area.

Figure 11:
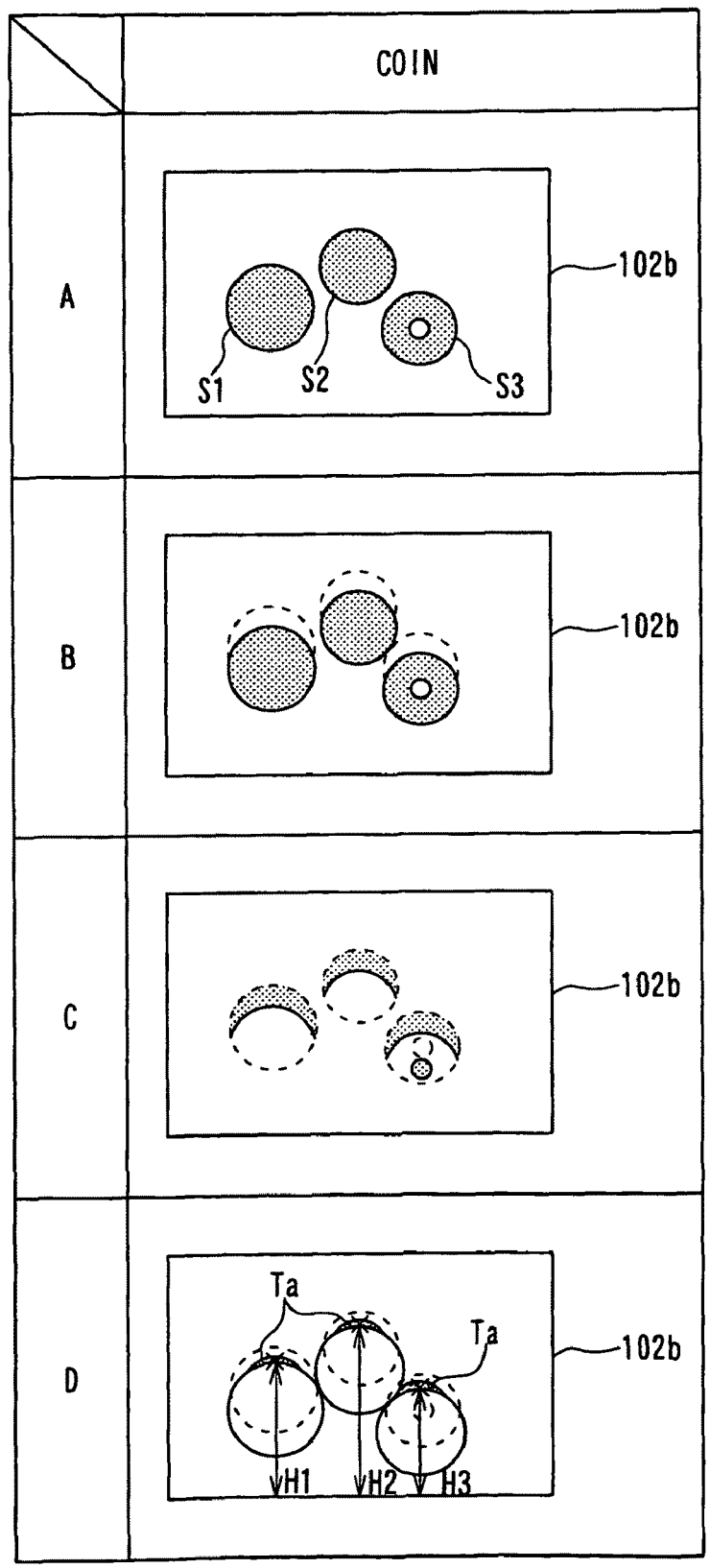
FIG. 11 is a drawing which shows processing for determining a tip area to be ignored by performing a finger width estimation based on an object area and a Y-axis position of a tip area.

In addition, some goods, which is not a finger, have shapes which could be erroneously determined as an actual finger because a width W being within the predetermined range. There may be a case in which the above mentioned goods is placed on the input surface 102a of the touch panel 12a. FIG. 11 is a drawing which shows processing for determining a tip area to be ignored by performing a finger width estimation based on an object area and a Y-axis position of a tip area. For example, the input image "A" in FIG. 11 shows a binarized image in a case that coins are placed on the input surface 102a. If the input image "A" is processed into a shifted image "B", the difference image "C", and the diminished image "D" as explained above, since the size of the coins is similar to a finger width, the width W of the tip area Ta may fall within the predetermined range. Therefore, the tip areas may be erroneously determined as the fingertips. The diminishing process is performed to shrink the end area in all directions.

There are some differences between a finger and a coin on an image. In the case of a finger, a base side of an area of a finger image extends to a bottom side edge of the imaging range 102b. The bottom side edge is an edge on an entering side when a hand enters in the insertion direction. Contrary, a coin makes an isolated circular area in the imaging range 102b. Therefore, there is a background image between a bottom edge of the circular area and a bottom side edge of the imaging range 102b. The background image can be recognized as an area in which pixels take "0". Then, it is possible to verify that whether the non-overlapping area is an actual fingertip area by determining whether a value S/d estimated as a finger width is in a predetermined range or not. The value S is a total area of object image. In a case of FIG. 11, the total area S can be obtained by S=S1+S2+S3. The value d is a sum of distance between each non-overlapping area and a bottom side edge of the imaging range 102b. In a case of FIG. 11, the value d can be obtained by d=H1+H2+H3. As a result, it is possible to avoid incorrect determination effectively. That is, in the case of coin, the total area S is small because there is a background image on a bottom side of the imaging range 102b. Therefore, if an estimated finger width value calculated by S/d is smaller than a lower limit Wth1 of a predetermined range, the tip area can be ignored as the non-fingertip area. Alternatively, it is possible to perform processing for determining whether the potential tip area can be ignored or not by comparing each values S1/H1, S2/H2, and S3/H3 with the threshold value Wth1, respectively. For example, in the case of FIG. 11, if an expression S1/H1<Wth1 is satisfied, the potential tip areas S1 can be ignored.

Figure 17A:
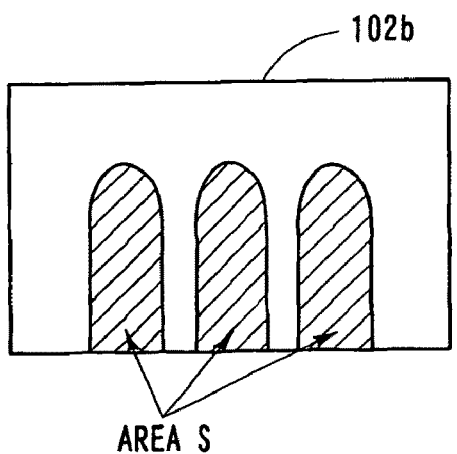
FIG. 17A is a plan view of an image showing a plurality of fingers which is used in still another method for determining whether a tip area is an actual fingertip or not.
Figure 17B:
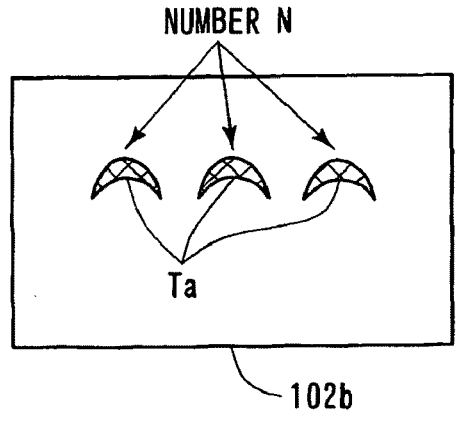
FIG. 17B is a plan view of a plurality of tip areas which is used in still another method for determining whether a tip area is an actual fingertip or not.

In the flow chart of FIG. 6, the number N is inputted in S1003, the total area S is inputted in S1004, and processing based on the above-mentioned principle is performed in S1005 and S1006. FIG. 17A is a plan view of an image showing a plurality of fingers which is used in still another method for determining whether a tip area is an actual finger or not. FIG. 17B is a plan view of a plurality of tip areas which is used in still another method for determining whether a tip area is an actual finger or not. As shown in FIG. 17A and FIG. 17B, it is possible to determine whether the tip area Ta is an actual fingertip area or not based on whether a mean finger area Sn falls within a predetermined range or not. The mean finger area Sn is obtained by Sn=S/N, where S is a total area of an object area in the image, and N is the number of the tip areas detected. In other words, the area S can be obtained as a total area of pixels with "1". The number N can be obtained as the number of areas which are not overlapped with each other. If the value Sn is smaller than a threshold value Snth1, the value Sn is in a predetermined range. This method is considered as an effective method especially in a case that a size in the Y-axis of the imaging range is set to a value which is capable of covering only a part of tip side of a finger so that an object image is mainly provided by only a finger when a hand is placed on the imaging range.

Returning to FIG. 6, in S1007, the device locates a representative point for the tip area Ta which is not ignored in the processing in S1002 and S1006. In this embodiment, a geometrical center-of-gravity position Gp of an area is used as a representative point. The center-of-gravity position Gp of an area can be calculated in a geometrical method. The calculating method for the center-of-gravity position Gp is well known. For example, first, a total value of X coordinates value of all the pixels of the object tip area, and a total value of Y coordinates value of all the pixels of the object tip area are calculated, and the coordinates of the center-of-gravity position G can be calculated by dividing the total values by the number of the pixels of the object tip area. Alternatively, the coordinates of the pixel which has the maximum Y-axis coordinates value in the object tip area can be used as the representative point instead of the center-of-gravity position Gp.

The input surface 102a of the touch panel 12a is touched by a finger pad which is slightly shifted downwardly along the X-axis from a distal end of a finger. Therefore, in an offset image "F" shown in FIG. 4 or FIG. 11, the center-of-gravity position Gp which is calculated by calculating process and shown by a provisional position image "E" is shifted along the Y-axis by a predetermined distance. FIG. 4 shows an offset image "F" in which a plurality of provisional positions Gp of fingertips are offset downwardly along the Y-axis by a predetermined distance to a plurality of positions G of fingertips. The positions G are determined and used as fingertip points G. However, the center-of-gravity position Gp of provisional position image "E" may be used as the fingertip point G as it is. In this case, offsetting process is unnecessary.

FIG. 12A is a plan view of an image where a fingertip is placed outside the imaging range. FIG. 12B is a plan view of an image where a fingertip is placed inside the imaging range. FIG. 12C is a plan view showing a detected position of the fingertip in the cases of FIGS. 12A and 12B.

Depending on a spatial relationship of the hand to the imaging range 102b, there may be cases in which the representative point determined by the above-mentioned algorithm using a difference image does not correspond to an actual fingertip. For example, as shown in FIG. 12A, in a case where the fingertip portion of the finger image F2 is placed beyond the imaging range 102b, it is impossible to verify the tip area. FIGS. 12A, 12B, and 12C show cases in which the imaging range 102b, the input surface 102 of the touch panel 12a, and the screen of the monitor 15 have the same corresponding coordinates range. If a fingertip is placed inside the imaging range 102b as shown in FIG. 12B, the tip area detected by the difference image is placed on an outer region of the imaging range as shown in FIG. 12C. Similarly, even if a fingertip is placed outside the imaging range 102b as shown in FIG. 12A, the tip area detected by the difference image is placed on an outer region of the imaging range as shown in FIG. 12C. Even in the case shown in FIG. 12A in which the actual fingertip is placed outside, it is true that the image actually shows a part of the actual finger. Therefore, a width of the tip area could be in the predetermined range with high probabilities. As a result, the tip area detected on the outer region of the imaging range may be erroneously determined as the actual fingertip area.

In this embodiment, as shown in FIGS. 13A and 13B and FIGS. 13C and 13D, the imaging range 102b includes a non-displayable area 102e. The non-displayable area 102e is defined on an outer rim region of an effective-coordinates range on the imaging range 102b. The non-displayable area 102e extends beyond an effective-coordinates range of the display screen of the monitor 15. The non-displayable area 102e may be also referred to as an outer rim area or an outer margin. Therefore, an inner rectangular area of the imaging range 102b is a displayable area. An effective-coordinates range of the input surface 102a is set to coincide with the effective-coordinates range of the display screen of the monitor 15. Therefore, the effective-coordinates range of the imaging range 102b is greater than both the effective-coordinates range of the input surface 102a and the monitor 15. In other words, the imaging range 102b includes a display corresponding area and a display outer rim area. The display corresponding area is the displayable area corresponding to the display range and the input surface 102a. The display outer rim area is the non-displayable area 102e which is formed along outside of the display corresponding area with a predetermined width. FIG. 13A is a plan view of an image where a fingertip is placed outside the imaging range. FIG. 13B is a plan view showing a detected position of the fingertip in a case of FIG. 13A. FIG. 13C is a plan view of an image where a fingertip is placed inside the imaging range. FIG. 13D is a plan view showing a detected position of the fingertip in a case of FIG. 13C.

As shown in FIGS. 13A and 13B, a portion of the finger image F1 which is protruded outside the screen forms a subject area in the non-displayable area 102e. Therefore, the tip area Ta determined based on a difference image and a fingertip position Tp located as a representative point of the tip area Ta are also exist in the non-displayable area 102e. On the other hand, as shown in FIGS. 13C and 13D, if the actual fingertip does not enter in the non-displayable area 102e but still remains in the displayable area, the tip area Ta and the fingertip position Tp are also exist in the displayable area and in the screen of the monitor 15. Therefore, the device does not recognize the tip area Ta existing in the non-displayable area 102e as the actual fingertip, and even ignore it. In other words, the device handles such tip area as an invalid. The device recognizes the tip area Ta which does not exist in the non-displayable area 102e as the actual fingertip, and handles it as a valid. Therefore, the device can perform a control in which only a valid tip area Ta is used. As a result, the outputting module outputs the coordinates of the tip position as the coordinates of the fingertip point if the tip position located by the tip area locating module is located within the display corresponding area.

Figure 14:
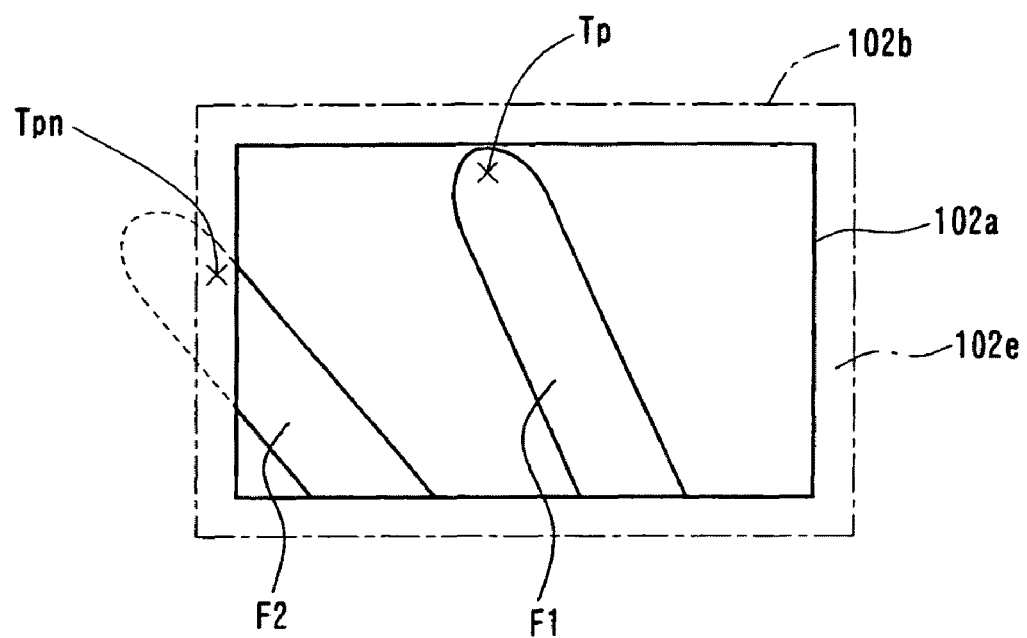
FIG. 14 is a drawing for explaining processing for determining whether a tip area is an actual fingertip or not.

FIG. 14 is a drawing for explaining processing for determining whether an object image is an actual finger image or not. For example, as shown in FIG. 14, even if a plurality of fingertip positions Tp, and Tpn are located, a determination for a valid or invalid can be performed individually, based on whether each of the fingertip points exists in the outer margin 102e or not. In FIG. 14, the fingertip Tp of the finger image F1 is determined valid. However, the fingertip Tpn of the finger image F2 is determined invalid, and is ignored. In the flow chart of FIG. 6, the determination based on the above-mentioned principle is performed in S1008-S1010. In a step S1008, the apparatus determines that whether the point G is on a predetermined outer margin 102e of the imaging range 10b or not. If the point G is on the outer margin 102e, the apparatus proceeds to a step S1009. In the S1009, the apparatus determines that an object image of the tip area is not a finger and ignores the tip area. If the point G is not on the outer margin 102e, the apparatus proceeds to a step S1010. In the step S1010, the apparatus determines that the object image of a tip area is a finger and accepts the determined point G of the fingertip. Alternatively, it is possible to employ a configuration in which no outer margin 102e is formed on an edge located on an entering side of a hand. In this embodiment, the entering side is a backward side in the Y-axis direction. For example, a bottom edge of the outer margin 102e may be placed coincide with a bottom edge of the imaging range 102b.

Figure 15:
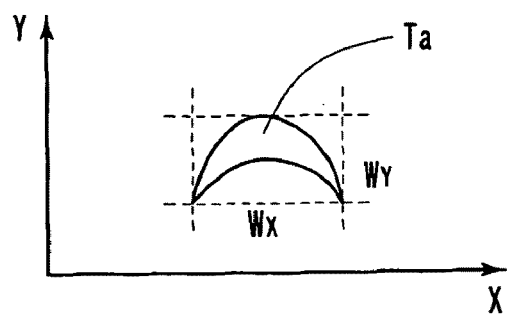
FIG. 15 is a plan view of a tip area showing an aspect ratio which is used in a method for determining whether a tip area is an actual fingertip or not.

Alternatively, it is possible to use several algorithms for determining whether the tip area Ta is the actual fingertip or not. For example, the following method can be used. In this case, a parallel shifting distance in the Y-axis for obtaining the second image from the first image is set in a value smaller than a finger width of a common adult. The tip area Ta is similarly extracted as a difference image between the first image and the second image. The tip area Ta easily becomes an oblong shape which has a width Wx in the X-axis longer than a width Wy in the Y-axis. It is possible to use an aspect ratio of the width Wx and Wy for verifying the actual fingertip. For example, if an X/Y aspect ratio RA of the tip area Ta is in a predetermined range, the tip area can be determined as the actual fingertip area. FIG. 15 is a plan view of a tip area showing an aspect ratio which is used in the method for determining whether an object image is an actual finger image or not. In this method, the X/Y aspect ratio RA is calculated by an expression RA=Wx/Wy.

For example, in the case of the paper or documents, as shown in FIG. 10A, the ratio RA becomes very large in comparison with the actual finger. In the case of the mobile-phone, as shown in FIG. 10B, since a protruding part, e.g., an antenna, is apparently narrower than the actual finger, the with Wx is not sufficient. Therefore, the ratio RA becomes small in comparison with the actual finger. As a result, in both cases in FIGS. 10A and 10B, it is possible to recognize the tip area as a non-fingertip area and to ignore it.

Figure 16:
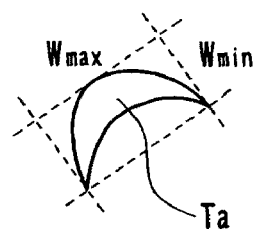
FIG. 16 is a plan view of a tip area showing an aspect ratio which is used in another method for determining whether a tip area is an actual fingertip or not.

FIG. 16 is a plan view of a tip area showing an aspect ratio which is used in another method for determining whether a tip area is an actual fingertip or not.

The method illustrated in FIG. 16 is designed to perform correct determination even if the device is configured to allow the operator to insert a finger obliquely with respect to the Y-axis. In this method, a maximum width Wmax and minimum width Wmin of the tip area Ta are detected based on the image of the tip area. For example, the device generates a plurality of pairs of parallel lines which circumscribe to the tip area Ta. Then, the device detects the maximum distance between the parallel lines among the plurality of pairs as the maximum width Wmax. The device detects the minimum distance between the parallel lines among the plurality of pairs as the minimum width Wmin. Then, the device calculates an aspect ratio RA replaceable with the X/Y aspect ratio by RA=Wmax/Wmin.

FIG. 17A is a plan view of an image showing a plurality of fingers which is used in still another method for determining whether an object image is an actual finger image or not. FIG. 17B is a plan view of a plurality of tip areas which is used in still another method for determining whether an object image is an actual finger image or not.

Alternatively, it is possible to employ a method illustrated in FIGS. 17A and 17B for verifying the tip area. In this method, first, the device estimates an average finger area. The average finger area may be obtained by a value of S/N, where an area S is a total area of objects in the imaging range, and a number N is the number of tip areas determined. The area S of the total area of objects can be obtained by summing an area of pixels of "1". The number N can be obtained by counting the number of non-overlapping areas. Then, the device determines whether the tip area Ta is an actual fingertip area or not based on a determination of whether the value of S/N is in a predetermined range or not. This method is considered as, an effective method especially in a case that a size in the Y-axis of the imaging range is set to a value which is capable of covering only a part of tip side of a finger so that an object image is mainly provided by only a finger when a hand is placed on the imaging range.

Returning to FIG. 5, if the fingertip determining processing in S108 is completed as explained above, in S109, the device checks which one of the tip areas is verified as the actual fingertip area. If the tip area evaluated was verified as the actual fingertip area in S108, the routine branches to "YES" and proceeds to S110. In S110, the device stores and outputs a position of the actual fingertip area. S110 provides an outputting module which outputs coordinates of the tip position as coordinates of the actual fingertip if the tip position is verified as the position of the actual fingertip. The location of a representative point for the fingertip area verified as the actual fingertip area is stored. In this embodiment, the coordinates for the point G is stored. The stored coordinates can be referenced from the other software and devices. If the routine branched to "NO" in S109, the coordinates for the tip area which is not the actual fingertip area is ignored and discarded. The outputting module, S110, outputs the coordinates of the tip position as the coordinates of the fingertip point at least in a condition that the touch panel 12a does not detect any touch input, when the tip position is determined and verified as the actual fingertip. Therefore, the pointer image can be displayed on the monitor 15 even before pressing the touch panel 12a. In addition, the pointer image can be displayed during pressing the touch panel 12a and after pressing the touch panel 12a. Then, a fingertip position locating processing is completed.

Figure 18:
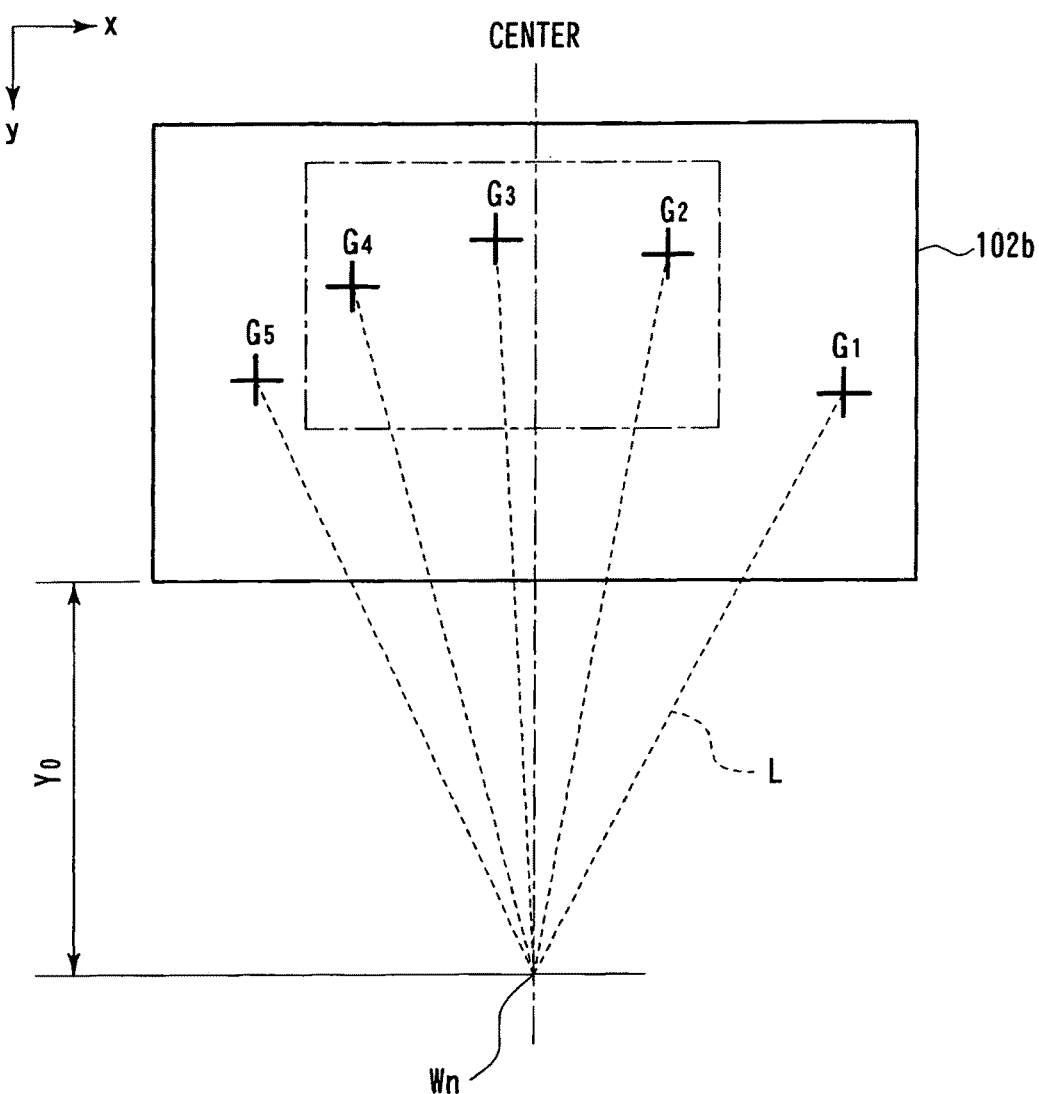
FIG. 18 is a drawing for explaining processing for determining a wrist position and a finger line.

FIG. 18 is a drawing for explaining processing for determining a wrist position and a finger line.

FIG. 18 shows a condition in which the fingertip positions G1-G5 are located by coordinates on the input surface 102a and on the image frame. Then, the device generates a pointer image frame by attaching images of the finger-shaped pointers on the fingertip positions G1-G5 on the image frame. The finger-shaped pointer image has no relation with the actual finger image. The finger-shaped pointer image is created so as to be narrower than the actual finger image F1. As a result, the device provides a pointer displaying module which displays a pointer image which is narrower than an actual finger in the image taken by the imaging device. The finger-shaped pointer image is created so as to be narrower than the actual finger image F1 with respect to almost all possible operators except a child. For example, a width of the finger-shaped pointer image can be set based on a statistical data of a finger width distribution for possible operators. For example, it is possible to use a finger width distribution data of Japanese aged 18 and over. In this case, a minimum finger width of 90% of candidates who are in a range defined by placing the average of the whole data on the center is selected as a reference finger width. The width of the finger-shaped pointer image can be set narrower than the reference width. For example, the width of the finger-shaped pointer image may be in a range equal to or wider than 50% of the reference width and equal to or narrower than 80% of the reference width. For example, in the case of the index finger, the width of the finger-shaped pointer image may be equal to or wider than 7 mm and is equal to or narrower than 14 mm at the first joint position.

On the other hand, a position of the tip area which is not determined as the actual fingertip area is not memorized as a fingertip position, and therefore, no finger-shaped pointer image is attached on the display image. As a result, the device provides a pointer displaying module which displays a pointer image for indicating the actual fingertip point based on a pointer image data prepared separately from the image taken by the camera 12b, and which does not display the pointer image at the tip area which is not determined as the actual fingertip. As a result, it is possible to prevent a problem in which an operator feels uncomfortable feelings caused by inconsistency between a displayed image and the actual position of the hand. That is because a finger-shaped image is attached on a position which is erroneously detected due to a something other than a finger and is displayed on the display range despite that the operator clearly recognizes that the hand is not placed on the imaging range 102b.

As shown in FIG. 14, the finger image F2 protruded into the non-displayable area 102e creates a tip area but such tip area is not determined as an actual fingertip area based on the algorithm shown in FIG. 6. The tip area Tpn is handled as invalid. Therefore, no pointer image is attached based on the tip area Tpn. However, the device may be configured to handle the tip area Tpn as a valid one and to attach a pointer image based on the tip area Tpn. In this case, the finger-shaped pointer image on the tip area Tpn is displayed in a form in which a fingertip is missed on the display range.

Figure 20:
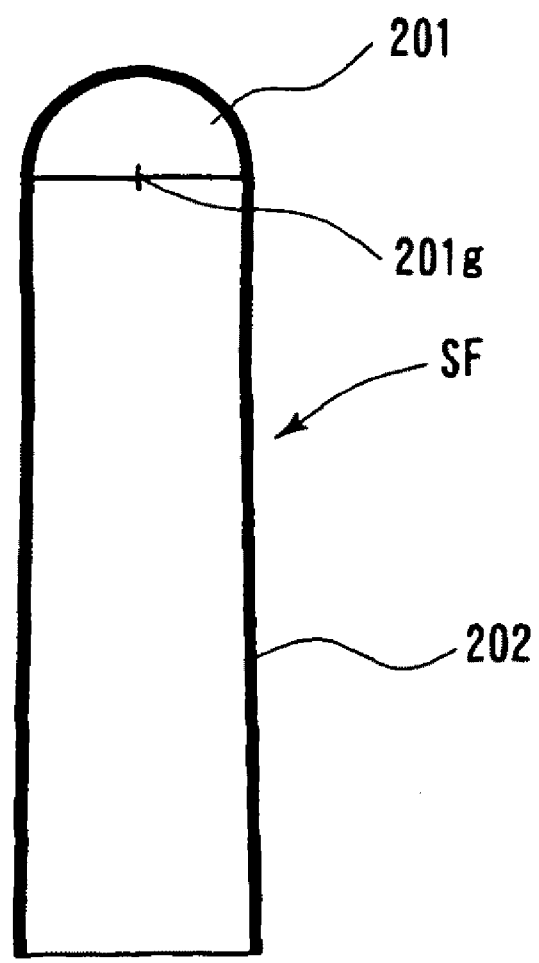
FIG. 20 is a plan view of another example of a finger-shaped pointer image.
Figure 21:
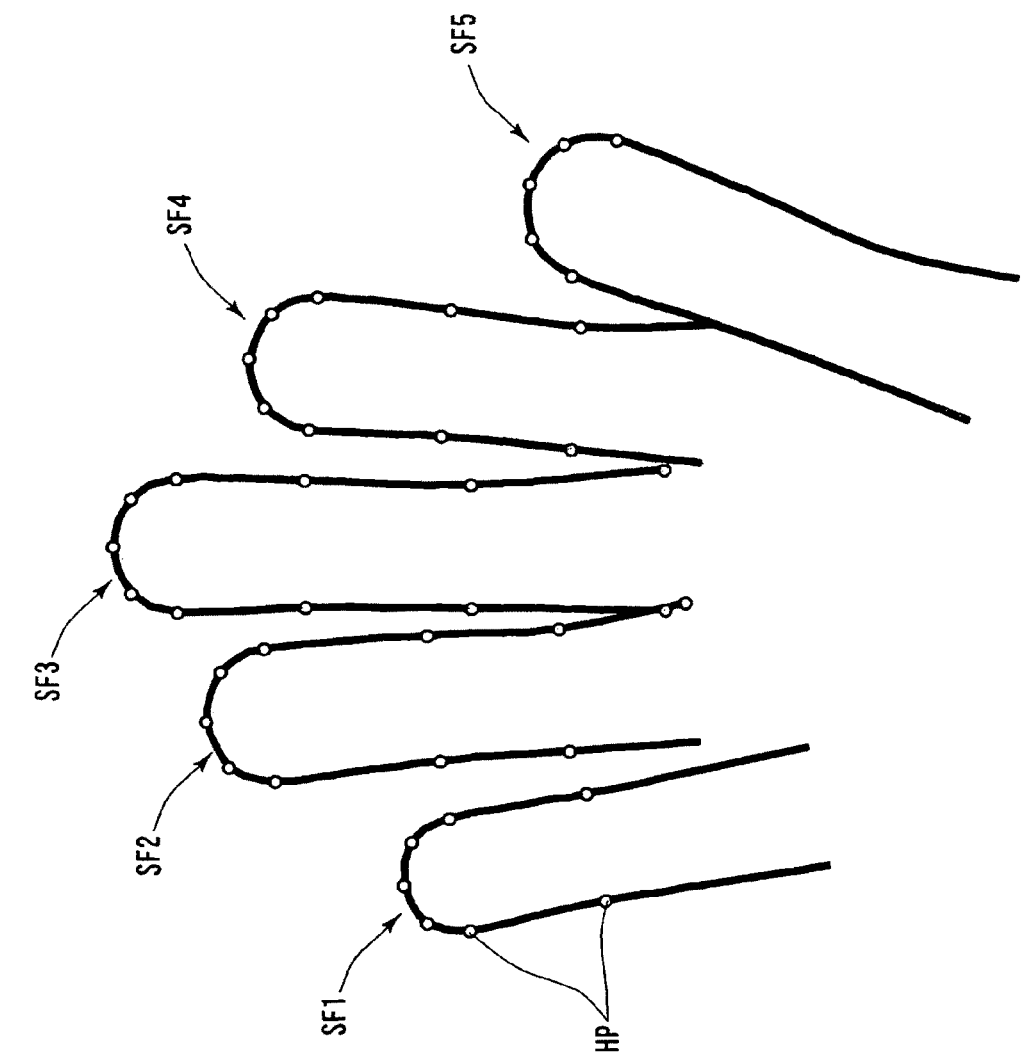
FIG. 21 is a plan view of still another example of a finger-shaped pointer image.
Figure 22:
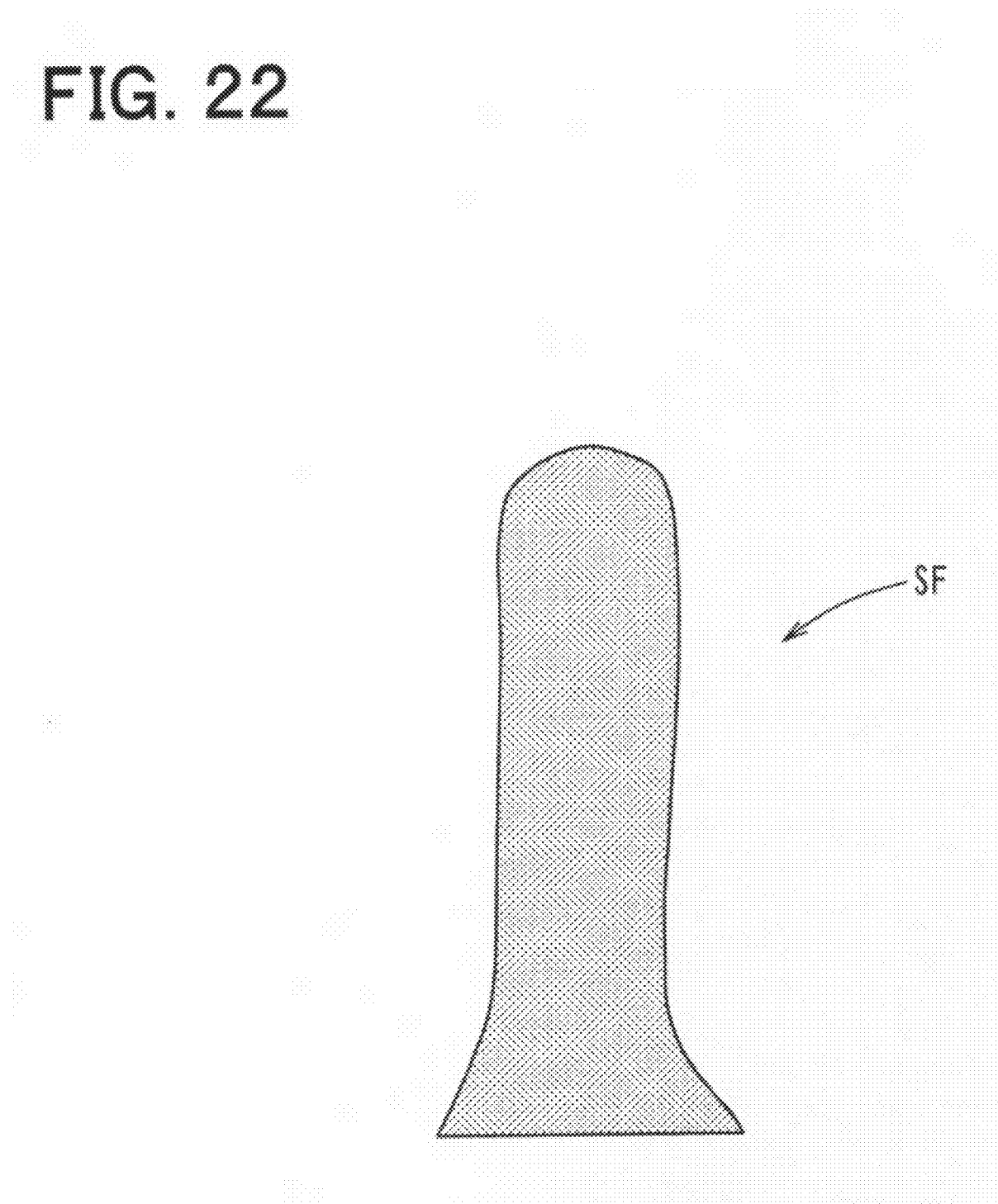
FIG. 22 is a plan view of yet another example of a finger-shaped pointer image.

As a pointer image, it is possible to use a simulated finger image which simulates a contour shape of the finger, i.e., a finger-shaped pointer image. FIG. 20 is a plan view of another example of a finger-shaped pointer image. FIG. 21 is a plan view of still another example of a finger-shaped pointer image. FIG. 22 is a plan view of yet another example of a finger-shaped pointer image.

As a simple one, as shown in FIG. 20, the simulated finger image may be provided by combining a circle shape 201 indicative of the outline of the fingertip and a rectangular shape 202 indicative of the outline of remaining finger parts. Indicating the fingertip by the circle shape is advantageous, because the center 201g of the circle is easy to use as a point which should be adjusted into the fingertip position determined. It is also possible to display a pointer image which is simpler than the simulated finger image, for example, an arrow head image similar to the pointer usually used on a personal computer.

On the other hand, as shown in FIG. 21, it is also possible to use a finger outline image data SF1-SF5 which shows the contour shape of the finger more precisely simulating the actual finger by using polygonal lines or curves, for example, the B-spline curve and/or the Bezier curve. The finger outline image data SF1-SF5 may be provided as a vector outline data defined by a series of handling points HP arranged corresponding to the finger contour shape.

It is also possible to use an actual finger image which is previously taken by imaging each finger in a separated manner. For example, the actual finger image may be provided by an actual finger image of an operator or a model finger image which is taken by imaging fingers of a professional model specialized for a hand image. In this case, a finger outline image data SF1-SF5 similar to that illustrated in FIG. 21 can be obtained by extracting an outline from a finger image using a well-known edge detection process, and by creating a vector outline data which approximates the extracted outline. Alternatively, as shown in FIG. 22, a pointer image SF may be provided by a bit map data which is provided by binarizing the finger image. In this case, it is not necessary to extract an outline of the finger.

FIG. 19A is a plan view of an example of a finger-shaped pointer image. FIG. 19B is a drawing for explaining processing for placing the finger-shaped pointer image shown in FIG. 19A.

As shown in FIG. 19A, a pointer tip point Gn is predetermined on a specific position in the distal end part of the pointer image SF. As shown in FIG. 19B, it is necessary to place the finger-shaped pointer image SF on the image frame so that the pointer tip point Gn is placed on the fingertip point G, i.e., G1-G5. In the illustrated case, the pointer images SF1-SF5 are placed so that each point tip point Gn is placed on corresponding one of the fingertip points G1-G5. In addition, each one of the pointer images SF1-SF5 is arranged to place a longitudinal direction thereof along a direction corresponding to a longitudinal direction of the actual finger. In other words, the longitudinal direction of the pointer image is placed along a predetermined direction which makes the operator to image the actual finger. In order to perform this placing process, it is necessary to determine a direction of a finger in addition to the fingertip point. For this purpose, the device sets a finger direction base Wn on the image frame, i.e., the display-coordinates plane as shown in FIG. 18. Then, the device defines a straight line which connects between the fingertip point G and the finger direction base Wn as a finger line. For this purpose, the pointer displaying module includes a finger direction base setting module and a pointer direction determining module. The finger direction base setting module sets a finger direction base on the coordinates plane which defines a displaying position of the pointer image on the display range. The pointer direction determining module determines a direction of the pointer image based on the finger direction base and the fingertip point. As shown in FIG. 19B, the device creates a pointer image frame for displaying the pointer images SF1-SF5 on the display range so that a longitudinal direction Ln of each pointer image SF is placed along with one of the directions, the finger lines L1-L5, determined in the pointer direction determining module and so that a position Gn of each distal end part of the pointer image is placed on one of the fingertip point G1-G5.

Bones for each one of the fingers are arranged in the form converged towards a wrist joint. Therefore, as shown in FIG. 18, the finger direction base Wn may be defined as a wrist position representing the wrist. The finger direction base Wn may be also referred to as the wrist position Wn. As described above, the input surface 102a has designed to have a size in which only a distal end part of a hand can be placed. In addition, the input device 12 is manipulated by entering and inserting a hand into the imaging range from a near side. Therefore, the wrist position Wn is set on a position which is below the display range and is outside the display range. The finger direction base setting module sets the finger direction base on an outside of the display range. The finger direction base being a wrist position estimated as a position of a wrist. In the case of FIG. 18, the wrist position Wn is set on a position which is distanced downwardly from the bottom edge of the display range by a predetermined length Y0 in the Y-axis. In this embodiment, a Y-axis position of the wrist position Wn is defined fixedly on the basis of the bottom edge of the display range regardless of a Y coordinates of the fingertip point G1-G5. Therefore, it is possible to simplify a setting algorithm for the wrist position Wn. The finger direction base setting module sets the wrist position which is common for all the fingertip points determined on the display range. In FIG. 18, the X coordinates of the wrist position Wn is fixed in the center of the X-axis size of the imaging range 102b, i.e., the input surface 102a and the screen of the monitor 15. In a case that a height of the display region in the Y-axis is expressed by Y, it is preferable to set a value of Y0+L/2 in a range equal to or longer than 100 mm and equal to or shorter than 200 mm. In this case, the pointer displaying module displays an image of a hand at least including a finger on the display range. The image of the hand is arranged to have a spatial relationship with respect to the display range. In the spatial relationship, a wrist is placed on an outside and below the display range. The finger direction base setting module sets the wrist position on a position which is distanced downwardly from the bottom edge of the display range by a predetermined length in the Y-axis, where the Y-axis is a vertical direction of the display range, and the X-axis is a direction perpendicular to the vertical direction.

Figure 19:
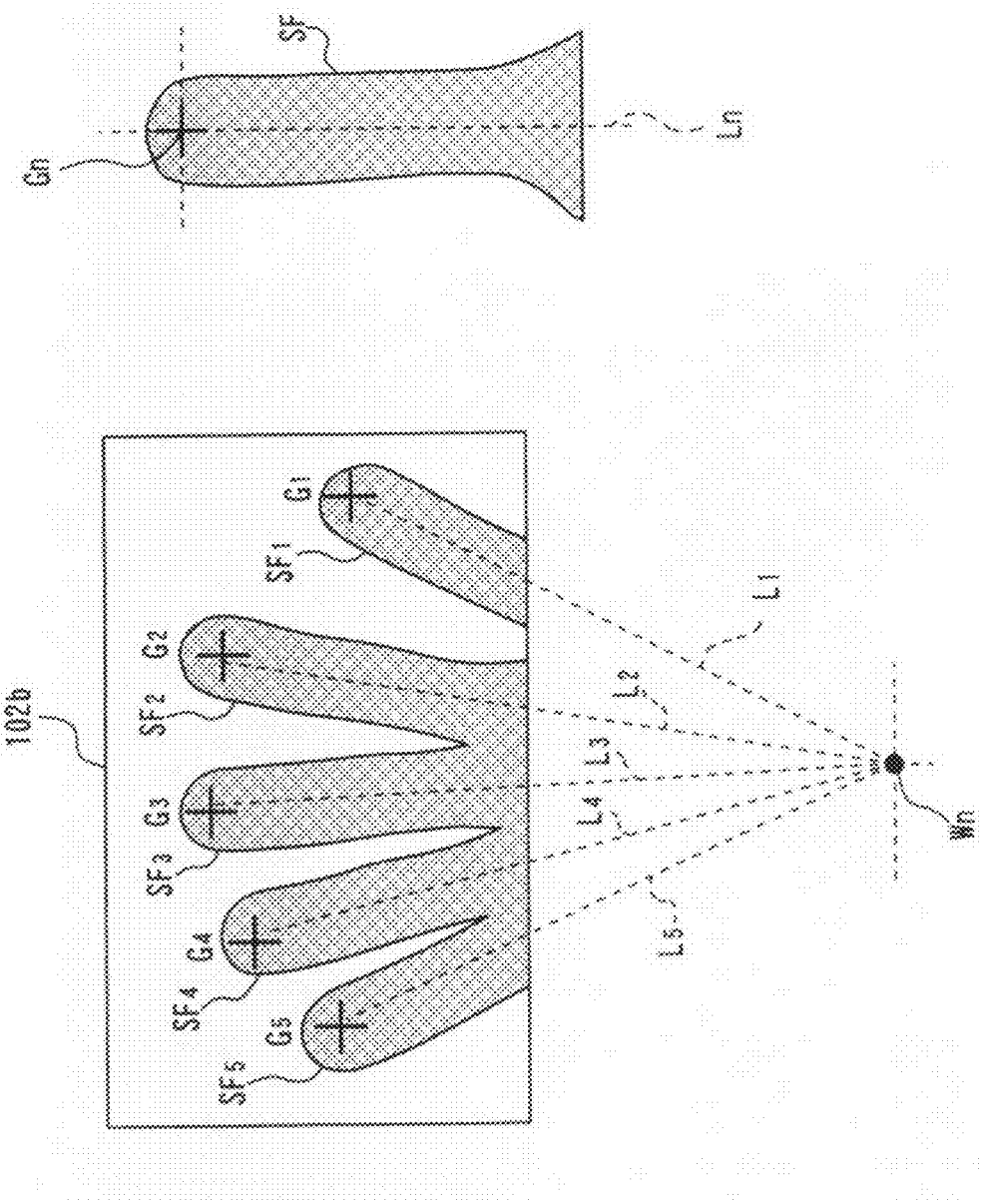
FIG. 19A is a plan view of an example of a finger-shaped pointer image.
FIG. 19B is a drawing for explaining processing, for placing the finger-shaped pointer image.

As explained above, a pointer image frame is created as shown in FIG. 19. The created pointer image frame is transmitted to the graphic controller 110. In the graphic controller 110 the pointer image frame is compounded with an input screen image frame data acquired separately, and is displayed on the monitor 15. In order to compound the input screen image frame data and the pointer image frame data, it is possible to employ the following method according to a data form of the pointer image SF.

FIRST EXAMPLE

In a case that the pointer image data is initially described in a bit map data form, the input screen image frame data and the pointer image frame data can be compounded by using the alpha blending processing among corresponding pixels. As a result, it is possible to display the pointer image on the input screen image in an overlapping form in which the pointer image can be transparently seen.

SECOND EXAMPLE

In a case that the pointer image data is described in a vector outline data form, it is possible to employ a method which comprises a step for generating an outline of a pointer image using the pointer image frame data, a step for generating a bit map data which is generated by rasterizing an inner area of the outline, and a step for performing the same alpha blending processing as described in the first example.

THIRD EXAMPLE

It is possible to employ a method which comprises a step for drawing an outline on an input screen image frame using the vector outline data which forms the pointer image data, a step for extracting pixels on the input screen image corresponding to the inside of the outline, and a step for shifting values of the extracted pixels uniformly.

In the first through third examples, the pointer image may be displayed in a form in which the outline is emphasized. For example, a pixel which form the outline of the pointer image data may be displayed in an emphasized manner by increasing a blend ratio of the pointer image data. In addition, it is also possible to make the pointer image data into the image data of only the outline described by the bit map data form or the vector outline data form, and to display only the outline in an overlapping manner.

As shown in FIG. 1, the screen of the monitor 15 is disposed away from a direction for looking a finger on the touch panel 12a from an operator who sits down on the driver seat 2D or the passenger seat 2P, therefore, the operator can not look both the hand for operation and the monitor 15 simultaneously. Therefore, the pointer image is the only information source for understanding and recognizing a position of a hand. In the embodiment, it is possible to display the pointer image SF which indicates each finger and has a shape narrower than the actual finger image regardless of the actual finger image on the image taken by the imaging device. As a result, it is possible to effectively eliminate a problem in which operation feeling is lowered by displaying an enlarged thick form of the finger image.

This advantage becomes still more remarkable in a case that the imaging range 102b is reduced. In other words, the advantage becomes still more remarkable in a case that an area of the input surface 102a of the touch panel 12a is reduced. Chain lines in FIGS. 4 and 18 show such a reduced imaging range. FIG. 23A is a plan view showing a reduced area of an input surface and a hand. FIG. 23B is a plan view showing an image in the case of FIG. 23A. FIG. 23C is a plan view of a display image which displays a key board and a finger-shaped pointer image in an overlapping manner.

In this case, the imaging range has a size which can take an image of whole of at least two fingers among the index finger, the middle finger, and can not take an image of whole of four fingers. That is, the imaging range has a size in which all of the index finger, the middle finger, the third finger, and the little finger can not be placed. As shown in FIG. 23, the imaging range has a size in which three fingers including the index finger, the middle finger, and the third finger can be placed, or in which two fingers including the index finger and the middle finger, or the middle finger and the third finger can be placed.

Figure 24:
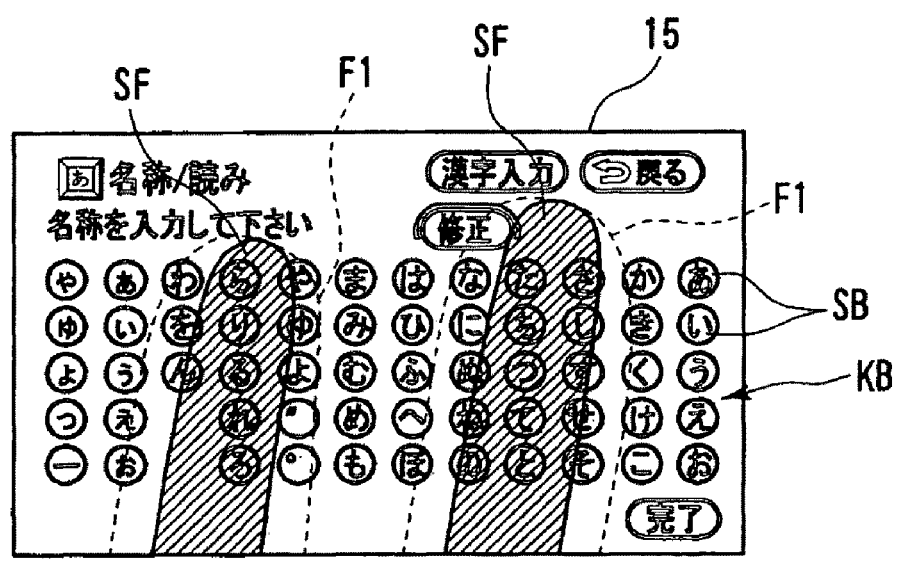
FIG. 24 is a plan view of a display image which displays a keyboard and a finger-shaped pointer image in an overlapping manner.

FIG. 24 is a plan view of a display image which displays a keyboard and a finger-shaped pointer image in an overlapping manner.

In this case, the imaging range is a rectangular shape having a longitudinal length in the X-axis corresponding to a width direction of the hand and a lateral length in the Y-axis. The longitudinal length is in a range equal to or longer than 60 mm and equal to or shorter than 80 mm. The lateral length is in a range equal to or longer than 30 mm and equal to or shorter than 55 mm. For example, the longitudinal length is 70 mm. The lateral length is 43 mm. Only two fingers can be placed within the imaging range. However, as shown in FIG. 24, if an actual finger image F1 which is just binarized after taking as an image is displayed on the display range on the monitor 15, the actual finger image F1 for two fingers are largely enlarged by an amount of reduction of the imaging range. Therefore, the actual finger image F1 on the display range covers too wide area to display a background image, such as a software keyboard image. In this embodiment, the monitor 15 displays a software keyboard KB for a Japanese kana syllabary input. The number of software-key images SB exceeds 50. A plurality of software-key images SB, three or more, arranged in a width direction of the finger are overlapped with an enlarged actual finger image F1. The monitor 15 displays the software-key images SB on the display range at predetermined positions. Each position for each image SB is determined to provide a keyboard image. Each one of the software-key images SB has an area corresponding to a key-operation area. In the illustrated case, each key-operation area has a rectangular shape or a circle shape. Positions for the software-keys are defined on an input coordinates plane of the touch panel 12a. Adjacent software-keys are isolated by a predetermined gap. That is, the software-key images are displayed with sizes and gaps. The sizes and gaps are predetermined so that the plurality of software-key images arranged on a width direction of the finger are overlapped with an imaginary finger projection area of the actual finger image. For example, three software-keys may be overlapped with the imaginary finger projection area. The imaginary finger projection area is provided by imaginarily projecting the actual finger image on the imaging range onto the display range of the monitor 15 at a corresponding position and with a corresponding size based on the coordinates system defined on both the imaging range and the display range. In this case, it is so difficult to know whether a finger is oriented to a target one of the software-key images or not. As a result, there may be a problem to press a wrong software-key next to the target one by mistake.

However, if it is possible to replace the actual finger image F1 by a finger-shaped pointer image SF which is narrower than the actual finger image F1, the number of overlapping software-keys can be decreased. In the case illustrated in FIG. 24, the number of software-key images SB which are arranged in the width direction and overlap with the pointer image SF can be reduced to two or one. As a result, it is possible to reduce a feeling of high density of the software-key images around the pointer image SF. It is possible to know which one of the software-key images is pointed and operated. As a result, it is possible to prevent the problem to press a wrong software-key image next to the target one. It is apparent that the device can provide improved operation feeling.

Hereafter, various modifications for setting a wrist position are explained.

Figure 25:
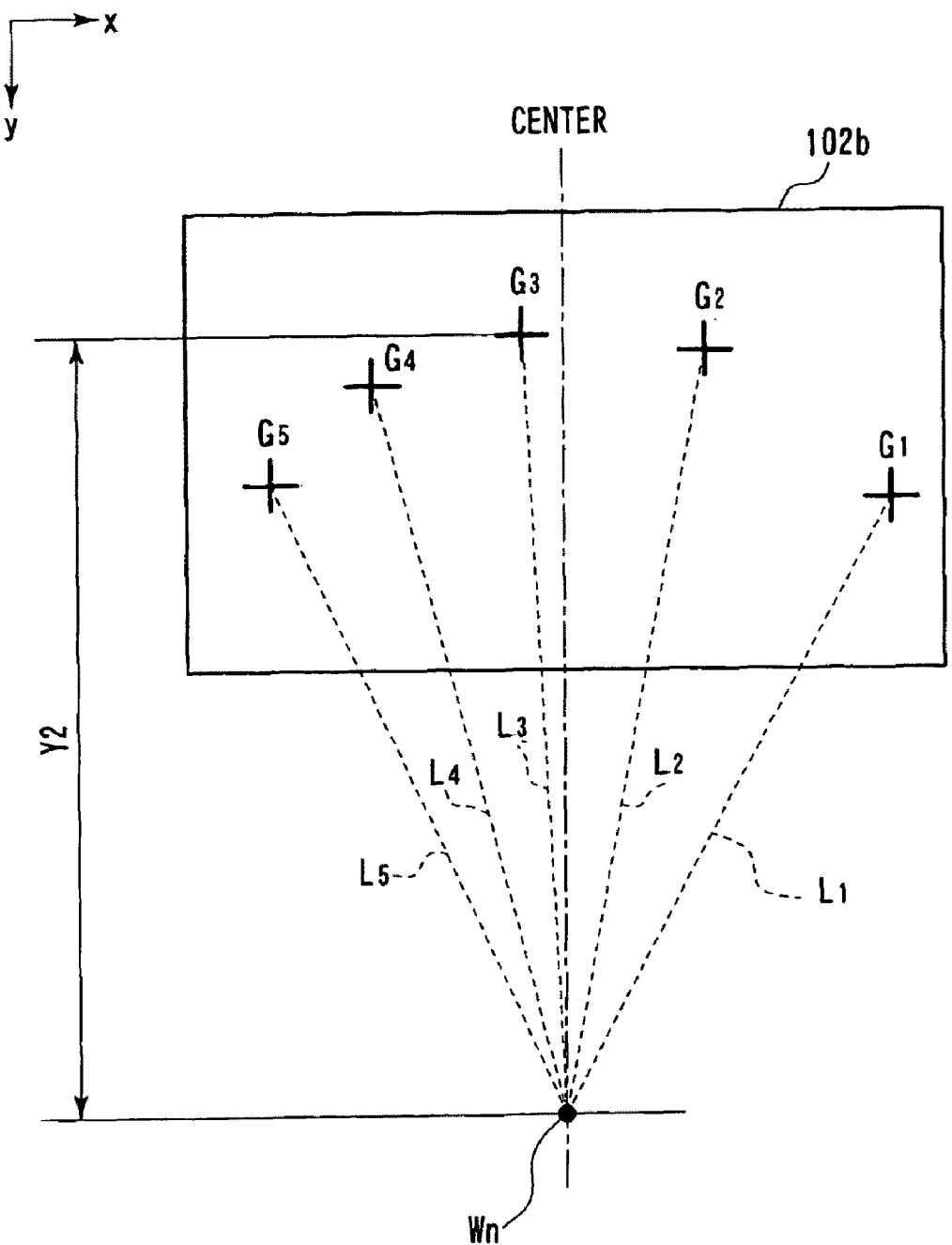
FIG. 25 is a drawing for explaining another example of processing for determining a wrist position.

First, in a case that an input position in the Y-axis may vary a lot, it is necessary to take into consideration a change of a wrist position in the X-axis. FIG. 25 is a drawing for explaining another processing for determining a wrist position. In this case, as shown in FIG. 25, if a wrist position Wn could be set on the display plane so that the wrist position Wn establishes a predetermined spatial relationship with the determined fingertip points G, it is possible to improve reality of arrangement of the pointer image SF. In detail, it is preferable that a wrist position Wn is set at a position which is apart from the determined fingertip points G downwardly in the Y-axis by a fixed length Y2, for example, Y2 is in a range equal to or longer than 100 mm and equal to or shorter than 200 mm. In this case, the finger direction base setting module sets the wrist position to have the spatial relationship which is predetermined with respect to the fingertip point determined in the tip area locating module. The finger direction base setting module sets the wrist position on a position which is distanced downwardly from the fingertip point by a predetermined length in the Y-axis.

Next, it is explained that a case where the input device 12 arranged in a form shown in FIG. 1 is operated from the seat 2D or the seat 2P. In this case, the input device 12 is placed on the left side or the right side of the operator. When the operator sits down on the seat, if the operator wants to move the hand placed on the input device 12 along the Y-axis, the operator mainly moves his or her lower arm by rotating joints on the shoulder and the elbow. As a result, the movement of the hand which can be detected by imaging the hand on the input surface 102a is similar to a parallel movement along the Y-axis. In addition, directions, i.e., angles, of the fingers related to an inputting operation are not changed largely. However, when moving the hand along the X-axis, the operator mainly rotates the wrist. Therefore, the movement of the hand which can be detected by imaging the hand on the input surface 102a is similar to a rotating motion of the hand about a rotating axis placed close to the center of the hand. As a result, the direction of the finger related to an inputting operation is changed according to a rotating angle of the hand.

FIG. 26A is a plan view of an image showing a palm. FIG. 26B is a plan view of an image showing an angle RD of a palm. FIG. 26C is a drawing for explaining still another processing for determining a wrist position. FIG. 26 illustrates a method in which a position of the wrist position on the X-axis is varied according to a position of the fingertip points G on the X-axis. This method is preferable in order to reflect movement of a hand. In this case, the finger direction base setting module is configured to set the wrist position so that an X coordinates of the wrist position is adjusted according to an X coordinates of the fingertip point. It is possible to even improve reality about the direction of the pointer image. In the method illustrated in FIG. 26, a standard wrist position W0 which shows a standard wrist position is fixedly defined below the display range, i.e., the imaging range. Then, the device determines an inclination angle RD of the actual finger image F1 with respect to the Y-axis. The device determines the X coordinates of the wrist position Wn so that a shifting amount SX in the X-axis from the standard wrist position W0 is increased as the inclination angle RD is increased. The shifting amount SX may be proportional to the inclination angle RD.

In the case of FIG. 26, the X coordinates of the standard wrist position W0 is defined on the center of the size of the imaging range in the X-axis. One of the fingertip points which is located on the highest position in the imaging range among the plurality of fingertip points is selected as a reference. In the case of FIG. 26, the finger point G3 corresponding to the middle finger is selected as the reference. The Y coordinates of the standard wrist position W0 is defined on a position which is shifted downwardly from the reference finger point by a predetermined constant value Y2.

As mentioned above, assuming that a center of rotation exists inside a hand, a fingertip will follow on carrying out rotating in the direction of X, and rotating of a wrist position will be carried out to the reverse direction. For the actual finger image F1 which is inclined in a right up shape with respect to the Y-axis, the finger direction base setting module determines the X coordinates of the wrist position so that the wrist position is shifted to the left side in the X-axis from the standard wrist position W0. For the actual finger image which is inclined in a left up shape with respect to the Y-axis, the finger direction base setting module determines the X coordinates of the wrist position so that the wrist position is shifted to the right side in the X-axis from the standard wrist position W0. In detail, the device selects the actual finger image F1 which has the fingertip point located highest on the display range as a representative actual finger image. In the illustrated case, the image of the middle finger which has the fingertip point G3 is selected as the representative. Then, the device calculates an inclination angle RD of the representative actual finger image with respect to the Y-axis. It is defined that the clockwise direction is the positive direction of the inclination angle RD. For example, the inclination angle RD can be calculated from a gradient of a straight line obtained by performing the least square method for the pixels forming the actual finger image F1. Then, the device calculates the shifting amount SX according to the inclination angle RD. Alternatively, it is possible to use a look up table for determining the shifting amount SX based on the inclination angle RD. In this case, the table is stored in the ROM 103. The table contains a plurality of predetermined shifting amounts SX with respect to a plurality of inclined angles RD. Alternatively, it is possible to use an X coordinates instead of the shifting amount SX. In FIG. 26, the Y coordinates of the wrist position Wn is set so as to be always equal to the Y coordinates of the standard wrist position W0. That is, the wrist position Wn variable according to the inclination angle RD on a straight line which is parallel to the X-axis and passes through the standard wrist position W0. However, the wrist position Wn may be set variable along a circular path.

Alternatively, the actual finger image which has a fingertip point expressed by an X coordinates or Y coordinates nearest to the center of the imaging range in the X-axis or the Y-axis may be selected as the representative actual finger image. Alternatively, the wrist position Wn may be determined based on a representative fingertip point. The representative fingertip point may be an average point which can be obtained by calculating average coordinates of a plurality of fingertip points G1-G5. Alternatively, in a case that odd numbers of fingertip points are determined, the fingertip point located on the center may be selected as the representative actual finger image. Alternatively, in a case that even numbers of fingertip points are determined, an average point of two fingertip points, which are obtained by two actual finger images close to the center, may be used as the representative fingertip point. As described above, the finger direction base setting module determines the X coordinates of the wrist position so that a shifting amount in the X-axis from a standard wrist position is increased as an inclination angle of a representative actual finger image with respect to the Y-axis is increased. The standard wrist position is fixedly defined below the display range. The representative actual finger image has the fingertip point which is located on a highest position in the display range among the fingertip points of a plurality of actual finger images.

Figure 27:
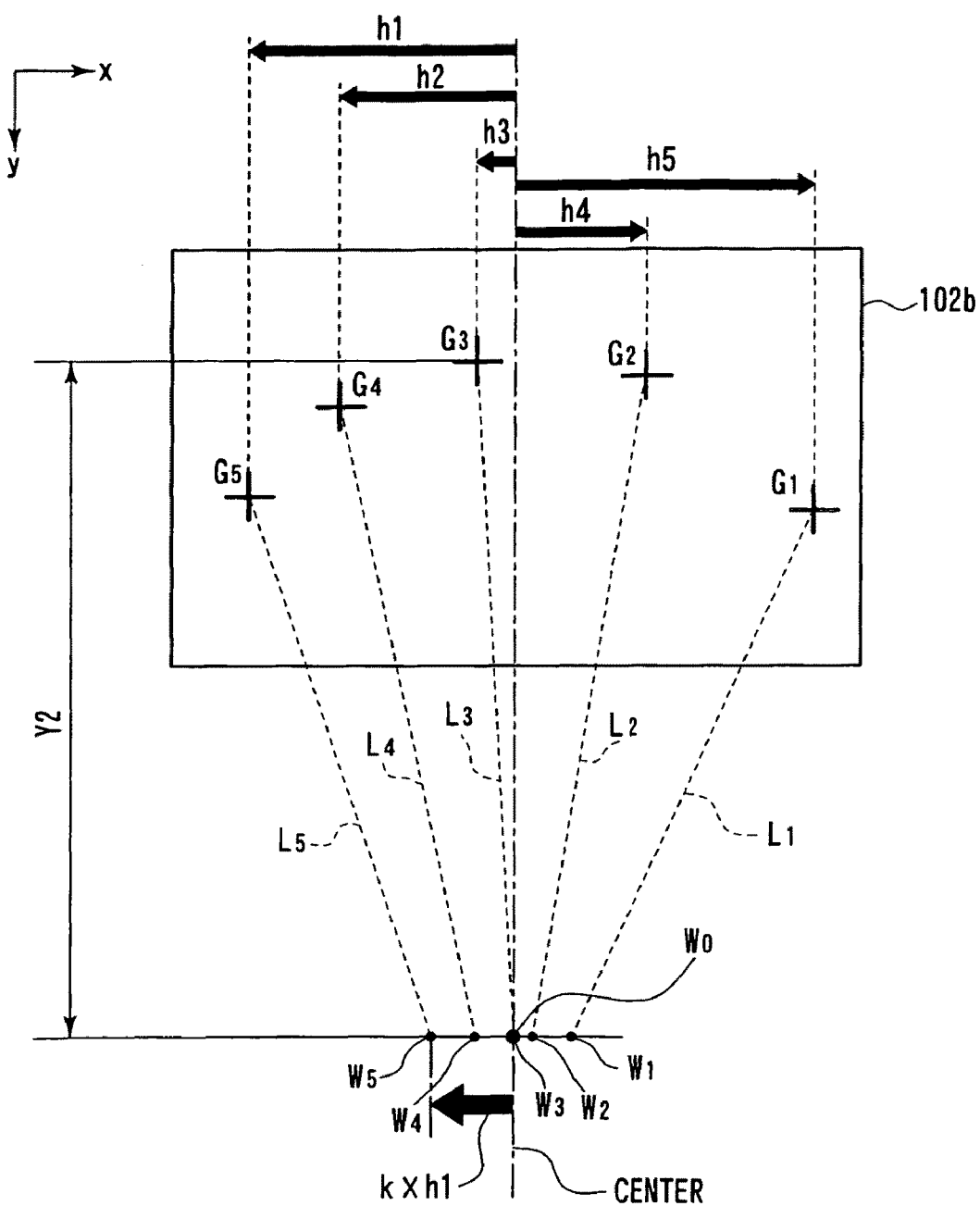
FIG. 27 is a drawing for explaining yet another example of processing for determining a wrist position.

In a case of an actual hand, bones for fingers have individual widths at a wrist, therefore, those bones are connected to a wrist joint in a distributed fashion in the X-axis. Therefore, in order to produce a real image, it is preferable to reflect such a distribution of joints. FIG. 27 is a drawing for explaining yet another processing for determining a wrist position. As shown in FIG. 27, a plurality of wrist positions W1-W5 are defined with respect to a plurality of fingertip point G1-G5, respectively. Then, arranging directions of the pointer image can be determined based on a plurality of pairs of one of the wrist positions W1-W5 and corresponding one of the fingertip points G1-G5. In this case, the finger direction base setting module sets a plurality of wrist positions each of which corresponds to one of a plurality of fingertip points determined on the display range. The pointer direction determining module determines a plurality of directions for the pointer images based on each one of pairs of the fingertip point and the wrist position. In detail, for the fingertip points G1 and G2 which are located on the right side from the standard wrist position W0 in the X-axis, the device determines the X coordinates of the wrist positions W1 and W2 so that the wrist positions W1 and W2 are placed on the right side from the standard wrist position W0 in the X-axis. For the fingertip points G3, G4, and G5 which are located on the left side from the standard wrist position W0 in the X-axis, the device determines the X coordinates of the wrist positions W3, W4, and W5 so that the wrist positions W3, W4, and W5 are placed on the left side from the standard wrist position W0 in the X-axis. As a result, the finger direction base setting module determines the X coordinates of the wrist position so that the wrist position is shifted to the right side from the standard wrist position in the X-axis for the fingertip point which is located on the right side from the standard wrist position in the X-axis. The finger direction base setting module determines the X coordinates of the wrist position so that the wrist position is shifted to the left side from the standard wrist position in the X-axis for the fingertip point which is located on the left side from the standard wrist position in the X-axis.

The X coordinates of the wrist position is set so that a shifting amount of the wrist position in the X-axis from the standard wrist position W0 is increased as the offset amount h1-h5 of the fingertip point in the X-axis from the standard wrist position W0 is increased. As a result, the finger direction base setting module sets the wrist position so that a shifting amount of the wrist position from the standard wrist position in the X-axis is increased as an offset amount of the fingertip point from the standard wrist position in the X-axis is increased. The shifting amount for one of the wrist positions is proportional to the offset amount of the fingertip point which is the corresponding one among the fingertip points. In detail, the device calculates a value by multiplying the offset amount of the fingertip point from the standard wrist position W0 in the X-axis by a predetermined coefficient k. The calculated value is provided as the shifting amount of the wrist position Wn from the standard wrist position W0 in the X-axis. The coefficient k may be in a range equal to or larger than 0.1 and equal to or smaller than 0.3.

Figure 28:
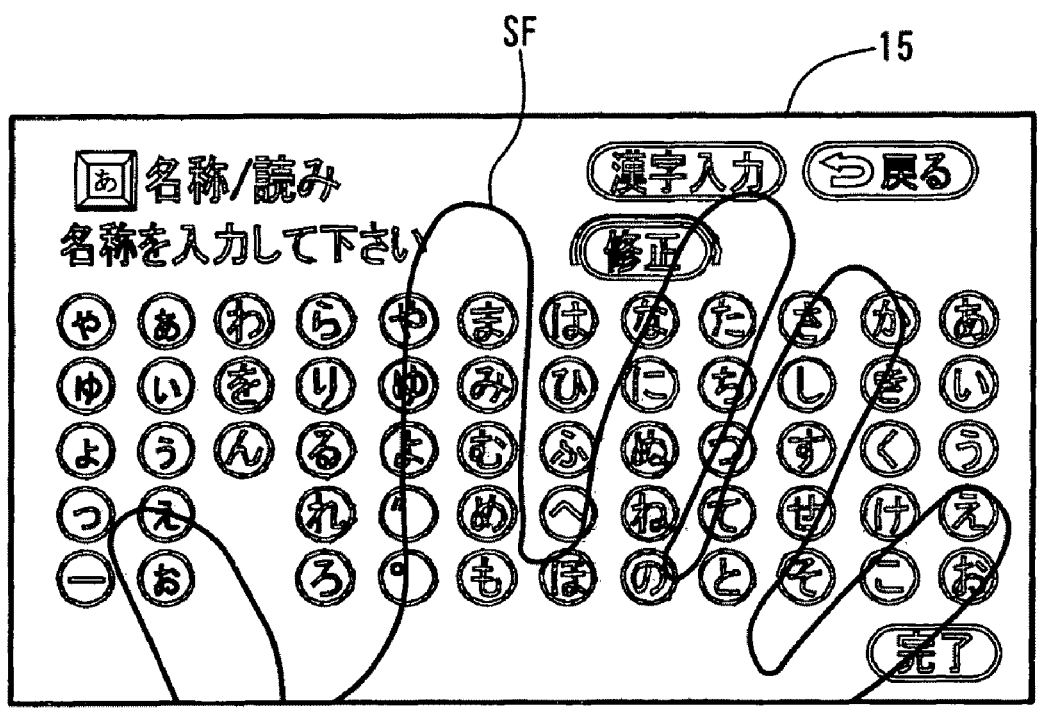
FIG. 28 is a plan view of a display image which displays a key board and a hand image in an overlapping manner.

FIG. 28 is a plan view of a display image which displays a key board and a hand image in an overlapping manner.

In a case that the imaging range 102b or the input surface 102a is large enough, the device may be configured to display an outline image SF of the hand image taken by the camera 12b in an overlapping manner on the basic image, such as the software keyboard, as shown in FIG. 28. In this case, the device verifies the tip area on the image by performing the similar method described in the above-mentioned embodiments. If the tip area is the actual fingertip area, the device performs the processing for displaying the outline image SF as shown in FIG. 28. If the tip is not the actual fingertip area, then, the device can avoid the processing for displaying the image taken by the camera 12b on the screen of the monitor 15 in the overlapping manner. Thereby, it is possible to prevent a problem of displaying something other than a hand on the monitor 15.

Figure 29:
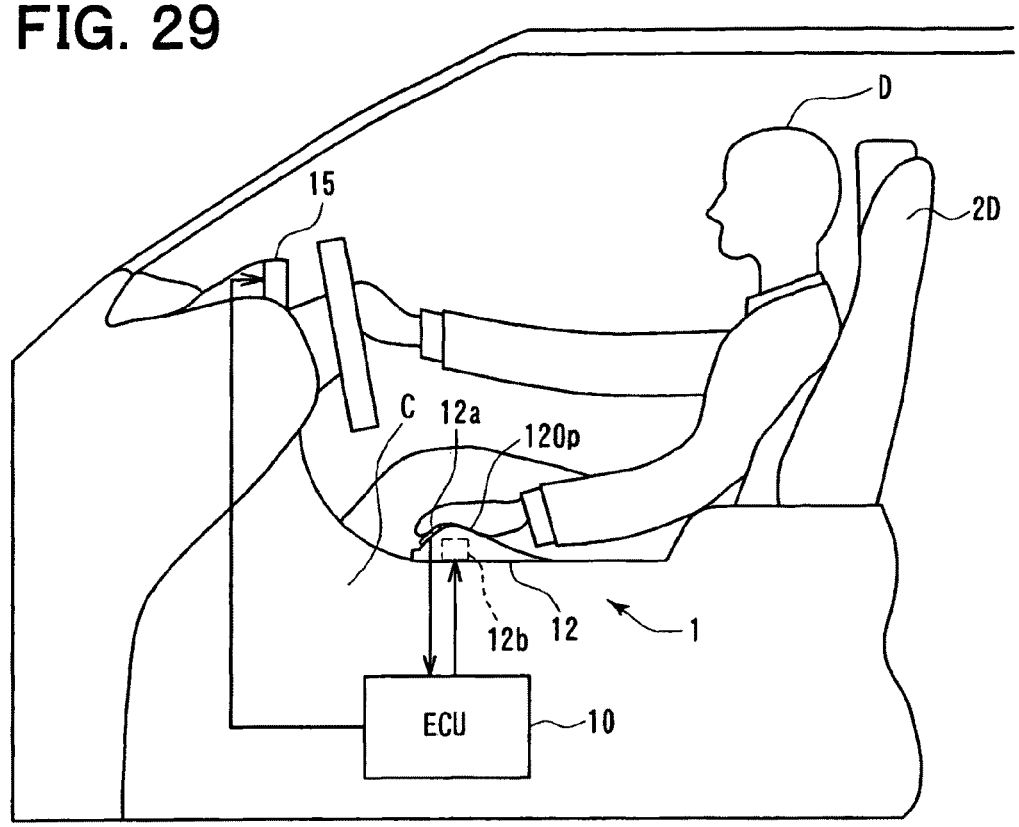
FIG. 29 is a cross-sectional side view of a user interface device mounted on a vehicle according to a modified embodiment of the present invention.
Figure 30:
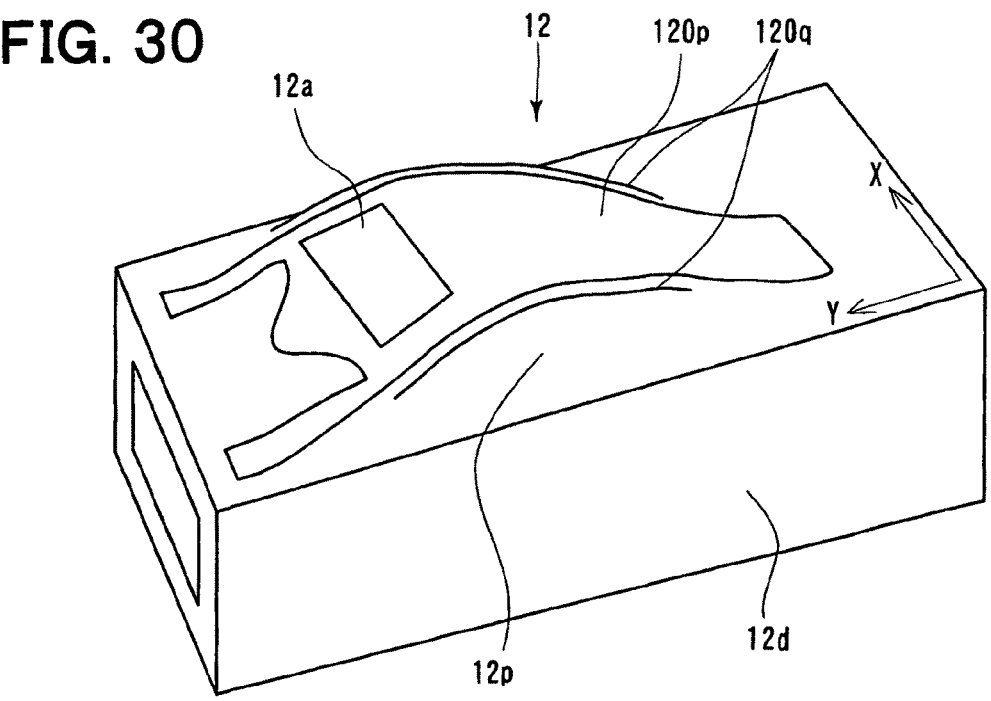
FIG. 30 is a perspective view of an input device mounted on a vehicle according to the modified embodiment of the present invention.

FIG. 29 is a cross-sectional side view of a user interface device mounted on a vehicle according to a modified embodiment of the present invention. FIG. 30 is a perspective view of an input device in the modified embodiment. FIG. 29 shows an example of configuration of a user interface device which is provided with a hand guide member. The hand guide member guides a user to insert a hand to the imaging range 102b of the hand camera 12b while restricting movement of the hand along a guiding direction which corresponds to an insertion direction. The width of the tip area, i.e., the non-overlapping area, is defined as a width in a direction intersecting perpendicularly with the guiding direction. FIG. 30 shows an enlarged perspective view of the input device 12. The input device 12 has a palm rest portion 12p on which the operator can put a hand. The palm rest portion 12p is placed on a top side of a case 12d. The palm rest portion 12p has a top surface which provides a guide surface 120p. The guide surface 120p is formed in an upwardly convex shape. The guide surface 120p has a convex portion on a middle part in a front and rear direction of the vehicle, i.e., the Y-axis. In other words, the guide surface 120p is formed in a wave shape in the front and rear direction. The guide surface 120p provides a surface which easily fits with the palm of the operator. Therefore, the guide surface 120p works as a restricting member which restricts the hand so that a longitudinal direction of the hand is placed along the Y-axis. The touch panel 12a is placed on a front side of the guide surface 120p. The touch panel 12a is formed contiguous to the guide surface 120p so that a distal end part of a hand, including fingertips, is placed on the touch panel 12a. As shown in FIG. 29, when a hand is placed on the guide surface 120p, at least one fingertip is placed on the touch panel 12a. Then, an image of the fingertip is taken by the camera 12b. In addition, at least one guide rib 120q is formed on a side part of the guide surface 120p. Preferably, a pair of guide ribs 120q are formed on both sides of the guide surface 120p. The guide rib 120q protrudes upwardly and extends along the Y-axis. The guide rib 120q guides a hand and fingers along the Y-axis. As a result, the finger is inserted and placed on the touch panel 12a, i.e., the imaging range, while being guided by the guide rib 120q. The guide surface 120p and the guide rib 120q form the guide member. The size of the imaging range is the same as that explained in the embodiment shown in FIG. 23. The components and modules in the above embodiments may be provided by software, hardware or combination of them.

Although the present invention is described based on the user interface device for a vehicle mounted device, the present invention is not limited to the embodiments, and may be applied to a graphical user interface device for a personal computer, for example.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An user interface device comprising:
an imaging device which takes an image of an imaging range in which a hand is placed along a predetermined insertion direction;
a tip area detecting module which detects a tip area in the insertion direction from the image taken by the imaging device;
a tip area locating module which locates a position of the tip area in the imaging range and sets a position of the tip area as a tip position;
a verifying module which verifies whether the tip position indicates a position of an actual fingertip based on at least one of a size of the tip area and an area of the tip area; and
an outputting module which outputs coordinates of the tip position as coordinates of the actual fingertip if the tip position is verified as the tip position of the actual fingertip; wherein
the tip area detecting module uses a first image which is the image taken by the imaging device and a second image which is an image obtained by shifting the first image parallel to the insertion direction, and detects a non-overlapping area generated on a distal end side in the insertion direction between the first image and the second image as the tip area;
the tip area detecting module detects a plurality of non-overlapping areas as potential tip areas, when a plurality of non-overlapping areas are separately detected by inserting a plurality of fingers into the imaging range; and
the verifying module determines whether at least one of the non-overlapping areas is an actual fingertip area or not based on whether a value S/d estimated as a finger width is in a predetermined range or not, where a value S is a total area of the image, and a value d is a sum of distance between each non-overlapping area and an edge of the imaging range, the edge being located on an entering side of the insertion direction.

2. The user interface device in claim 1 wherein
the imaging device takes an image of the hand from a lower side, the hand being inserted in a forward direction along a horizontal direction while a palm is faced down onto the imaging range.

3. The user interface device in claim 2 wherein
the imaging device includes a lighting device which lights up a surface of the hand to be imaged, and the imaging device takes an image of the hand based on reflected light from the hand.

4. The user interface device in claim 1 wherein
the tip area locating module locates the position of the tip area which is determined by the non-overlapping area and sets the position of the tip area as the tip position.

5. The user interface device in claim 1, wherein
the verifying module determines whether the at least one of the non-overlapping areas is an actual fingertip area or not based on whether a size or an area of the non-overlapping area is in a predetermined range or not.

6. The user interface device in claim 5, further comprising:
a hand guide member which guides a user to insert the hand to the imaging range while restricting movement of the hand along a guiding direction which corresponds to the insertion direction, and wherein
the verifying module determines whether the at least one of the non-overlapping areas is the actual fingertip area or not based on whether a width of the non-overlapping area is in a predetermined range or not, where the width is measured in a perpendicular direction to the guiding direction.

7. The user interface device in claim 1, wherein
the verifying module determines whether the at least one of non-overlapping areas is an actual fingertip area or not based on whether a value S/N estimated as a mean finger area is in a predetermined range or not, where the value S is a total area of the image, and a value N is the number of the non-overlapping area.

8. The user interface device in claim 1, further comprising:
a display device having a display range which is related to the imaging range by a coordinates system; and
a fingertip point displaying module which displays an actual fingertip point on the display range in a visible manner.

9. The user interface device in claim 8, wherein
the fingertip point displaying module includes a pointer displaying module which displays a pointer image for indicating the actual fingertip point based on a pointer image data prepared separately from the image, and which does not display the pointer image at the tip area which is not determined as the actual fingertip.

10. The user interface device in claim 9, wherein
the pointer displaying module displays the pointer image with a shape narrower than an actual finger in the image taken by the imaging device.

11. The user interface device in claim 10, wherein
the pointer image is a simulated finger image which simulates a contour shape of the finger or an actual finger image which is taken by imaging each finger in a separated manner.

12. The user interface device in claim 11, further comprising:
a restricting member which restricts an imaging distance of the imaging device to the hand as an object in a predetermined distance, wherein
the imaging range of the imaging device has a size capable of imaging only a part of fingers on a distal end part of a hand of an average adult, when the imaging distance to the hand of the average adult is restricted and the fingers are stretched, the part of the fingers being formed by the index finger, the middle finger, the third finger, and the little finger.

13. The user interface device in claim 12, wherein
the imaging range has a size which can take an image of at least two fingers among the index finger, the middle finger, and cannot take an image of four fingers.

14. The user interface device in claim 13, wherein
the imaging range is a rectangular shape having a longitudinal length corresponding to a width direction of the hand and a lateral length, the longitudinal length being in a range equal to or longer than 60 mm and equal to or shorter than 80 mm, the lateral length being in a range equal to or longer than 30 mm and equal to or shorter than 55 mm.

15. The user interface device in claim 14, wherein
the display device displays software-key images on the display range at corresponding positions, the software-key images corresponding to key-operation areas defined on an input coordinates plane of an input device, and wherein
the software-key images are displayed with sizes and gaps so that a plurality of software-key images arranged on a width direction of the finger are overlapped with an imaginary finger projection area of the actual finger image, the imaginary finger projection area being provided by imaginary projecting the actual finger image on the imaging range onto the display range at a corresponding position and with a corresponding size based on the coordinates system.

16. The user interface device in claim 12, wherein
the restricting member is disposed in a fixed manner to satisfy a predetermined spatial relationship with respect to the imaging device, and includes a transparent support plate which is capable of supporting the hand to be imaged on a side surface thereof, the imaging device takes the image of the hand through the transparent support plate from an opposite side surface of the transparent support plate.

17. The user interface device in claim 16, wherein
the transparent support plate provides a touch input device which provides, on the side surface, an input coordinates system corresponding to the display range, and wherein
the outputting module outputs the coordinates of the tip position as the coordinates of the fingertip point at least in a condition that the touch input device does not detect any touch input, when the tip position is determined as the actual fingertip.

18. The user interface device in claim 17, wherein
the imaging range includes a display corresponding area corresponding to the display range, and a display outer rim area formed along outside of the display corresponding area with a predetermined width, and wherein
the outputting module outputs the coordinates of the tip position as the coordinates of the fingertip point if the tip position located by the tip area locating module is located within the display corresponding area.

19. The user interface device in claim 9, wherein
the pointer displaying module includes:
a finger direction base setting module which sets a finger direction base on a coordinates plane which defines a displaying position of the pointer image on the display range; and
a pointer direction determining module which determines a direction of the pointer image based on the finger direction base and the fingertip point, and wherein
the pointer displaying module displays the pointer image on the display range so that a longitudinal direction of the pointer image is placed along with the direction determined in the pointer direction determining module and a position of the distal end part of the pointer image is placed on the fingertip point.

20. The user interface device in claim 19, wherein
the finger direction base setting module sets the finger direction base on an outside of the display range, the finger direction base being a wrist position estimated as a position of a wrist.

21. The user interface device in claim 20, wherein
the pointer displaying module displays an image of a hand at least including a finger on the display range, the image of the hand being arranged to have a spatial relationship with respect to the display range in which a wrist is placed outside and below the display range, and wherein
the finger direction base setting module sets the wrist position on a position which is distanced downwardly from the bottom edge of the display range by a predetermined length in a Y-axis, where the Y-axis is a vertical direction of the display range, and an X-axis is a direction perpendicular to the vertical direction.

22. The user interface device in claim 20, wherein
the finger direction base setting module sets the wrist position to have a spatial relationship which is predetermined with respect to the fingertip point determined in the tip area locating module.

23. The user interface device in claim 22, wherein the pointer displaying module displays an image of a hand at least including a finger on the display range, the image of the hand being arranged to have a spatial relationship with respect to the display range in which a wrist is placed outside and below the display range, and wherein the finger direction base setting module sets the wrist position on a position which is distanced downwardly from the fingertip point by a predetermined length in a Y-axis, where the Y-axis is a vertical direction of the display range, and an X-axis is a direction perpendicular to the vertical direction.

24. The user interface device in claim 20, wherein the finger direction base setting module sets the wrist position which is common for all of the fingertip points determined on the display range.

25. The user interface device in claim 24, wherein an finger direction base setting module determines the X coordinate of the wrist position so that a shifting amount in an X-axis from a standard wrist position is increased as an inclination angle of a representative actual finger image with respect to a Y-axis is increased, the standard wrist position being fixedly defined below the display range, and the representative actual finger image having the fingertip point which is located on a highest position in the display range among the fingertip points of a plurality of actual finger images.

26. The user interface device in claim 19, wherein the finger direction base setting module sets a wrist position so that an X coordinate of the wrist position is adjusted according to an X coordinate of the fingertip point.

27. The user interface device in claim 26, wherein the finger direction base setting module determines the X coordinate of the wrist position so that a shifting amount in an X-axis from a standard wrist position is increased as an inclination angle of an actual finger image with respect to a Y-axis is increased, the standard wrist position being fixedly defined below the display range.

28. The user interface device in claim 27, wherein the finger direction base setting module determines the X coordinate of the wrist position so that the wrist position is shifted to the left side in the X-axis for the actual finger image which is inclined in a right up shape with respect to Y-axis, and determines the X coordinate of the wrist position so that the wrist position is shifted to the right side in the X-axis for the actual finger image which is inclined in a left up shape with respect to the Y-axis.

29. An user interface device comprising:
an imaging device which takes an image of an imaging range in which a hand is placed along a predetermined insertion direction;
a tip area detecting module which detects a tip area in the insertion direction from the image taken by the imaging device;
a tip area locating module which locates a position of the tip area in the imaging range and sets a position of the tip area as a tip position;
a verifying module which verifies whether the tip position indicates a position of an actual fingertip based on at least one of a size of the tip area and an area of the tip area; and
an outputting module which outputs coordinates of the tip position as coordinates of the actual fingertip if the tip position is verified as the tip position of the actual fingertip;
a display device having a display range which is related to the imaging range by a coordinates system; and
a fingertip point displaying module which displays an actual fingertip point on the display range in a visible manner; wherein
the fingertip point displaying module includes a pointer displaying module which displays a pointer image for indicating the actual fingertip point based on a pointer image data prepared separately from the image, and which does not display the pointer image at the tip area which is not determined as the actual fingertip, the pointer display module includes;
a finger direction base setting module which sets a finger direction base on a coordinates plane which defines a displaying position of the pointer image on the display range; and
a pointer direction determining module which determines a direction of the pointer image based on the finger direction base and the fingertip point, wherein
the pointer displaying module displays the pointer image on the display range so that a longitudinal direction of the pointer image is placed along with the direction determined in the pointer direction determining module and a position of the distal end part of the pointer image is placed on the fingertip point;
the finger direction base setting module sets the finger direction base on an outside of the display range, the finger direction base being a wrist position estimated as a position of a wrist,
the finger direction base setting module sets a plurality of wrist positions each of which corresponds to one of a plurality of fingertip points determined on the display range, and
the pointer direction determining module determines a plurality of directions for the pointer images based on a respective one of pairs of the fingertip point and the wrist position.

30. The user interface device in claim 29, wherein the finger direction base setting module determines an X coordinate of the wrist position so that the wrist position is shifted to the right side from the standard wrist position in an X-axis for the fingertip point which is located on the right side from a standard wrist position in the X-axis, and determines the X coordinate of the wrist position so that the wrist position is shifted to the left side from the standard wrist position in the X-axis for the fingertip point which is located on the left side from the standard wrist position in the X-axis.

31. The user interface device in claim 30, wherein the finger direction base setting module sets the wrist position so that a shifting amount of the wrist position from the standard wrist position in the X-axis is increased as an offset amount of the fingertip point from the standard wrist position in the X-axis is increased.

* * * * *